United States Patent
Kaneko et al.

(10) Patent No.: US 6,567,141 B1
(45) Date of Patent: May 20, 2003

(54) LIQUID CRYSTAL DISPLAY

(75) Inventors: Yasushi Kaneko, Sayama (JP); Makoto Arai, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/673,621

(22) PCT Filed: Feb. 23, 2000

(86) PCT No.: PCT/JP00/01042

§ 371 (c)(1),
(2), (4) Date: Oct. 19, 2000

(87) PCT Pub. No.: WO00/50954

PCT Pub. Date: Aug. 31, 2000

(30) Foreign Application Priority Data

| Feb. 23, 1999 | (JP) | 11/044431 |
| Jun. 21, 1999 | (JP) | 11/173942 |

(51) Int. Cl.[7] .............................. G01F 1/1336
(52) U.S. Cl. ................ 349/117; 349/101; 349/102
(58) Field of Search ............... 349/101, 102, 349/117

(56) References Cited

U.S. PATENT DOCUMENTS 6,426,785 B2 * 7/2002 Yamaguchi et al. ........ 349/101

FOREIGN PATENT DOCUMENTS

| JP | 4-97121 | 3/1992 |
| JP | 7-36028 | 2/1995 |
| JP | 7-84252 | 3/1995 |
| JP | 8-292413 | 11/1996 |
| JP | 9-120050 | 5/1997 |
| JP | 10-31211 | 2/1998 |
| JP | 10-282488 | 10/1998 |

* cited by examiner

Primary Examiner—James Dudek
(74) Attorney, Agent, or Firm—Armstrong, Westerman & Hattori, LLP

(57) ABSTRACT

With a liquid crystal display device comprising an STN liquid crystal element (20) comprised of 200° to 260° twist aligned nematic liquid crystal (6) sandwiched between a first substrate (1) thereof, provided with a reflector (7) and first electrodes (3), and a second substrate (2) thereof, provided with second electrodes (4), a retardation film (12), and a polarizing film 11 that are disposed on the outer side of the second substrate (2) of the STN liquid crystal element, black display of low reflectance can be obtained in all wavelength regions, thereby enabling bright display in high contrast to be effected by setting a Δnd value of the STN liquid crystal element 20 indicating a birefringent tendency thereof in a range of 0.7 to 0.8 μm, a retardation value indicating a birefringent tendency of the retardation film (12) in a range of 0.35 to 0.40 μm, and an intersection angle formed by a phase delay axis of the retardation film (12) and an absorption axis or a transmission axis of the polarizing film (11) in a range of 30° to 45°.

24 Claims, 14 Drawing Sheets

LIQUID CRYSTAL DISPLAY

TECHNICAL FIELD

This invention relates to the construction of liquid crystal display devices. In particular, the invention is concerned with a reflection-type liquid crystal display device and a transflective liquid crystal display device employing a single polarizing film method, for effecting bright display in black and white or in color by means of a reflector or a transflective reflector, and a sheet of polarizing film provided in a liquid crystal element of the device.

BACKGROUND TECHNOLOGY

For a reflection-type liquid crystal display device, there has been mainly adopted a construction wherein a TN (twisted nematic) liquid crystal element or an STN (supertwisted nematic) liquid crystal element is disposed between a pair of polarizing films, and a reflector is installed on the outer side of one of the polarizing films.

With such a reflection-type liquid crystal display device, however, external light passes through each of two sheets of the polarizing films twice from the time when the external light enters from the visible side of the device until it goes out towards the visible side after reflected by a reflector, so that reduction in light quantity is increased, thereby lowering brightness of images in display. Moreover, since the reflector is installed on the outer side of a glass substrate of the liquid crystal element, there has arisen a problem that shadows appear on display.

To cope with the problem, a single polarizing film type liquid crystal display device, capable of effecting display with just one sheet of polarizing film, has since been proposed. With such a liquid crystal display device having only one sheet of polarizing film, reduction in light quantity can be decreased in comparison with the case of a conventional reflection-type liquid crystal display device employing two sheets of polarizing films, thereby improving brightness of images in display.

Further, with the a single polarizing film type liquid crystal display device, it is possible to solve the problem of the shadows appearing on display by forming a reflector inside a liquid crystal element.

Such a single polarizing film type liquid crystal display device is comprised of one sheet of polarizing film, one sheet of retardation film, and a liquid crystal element incorporating a reflector, as disclosed in, for example, Japanese Patent Laid-open No. H 4-97121 (JP, 04-97121, A).

With such a conventional single polarizing film type liquid crystal display device as described above, however, a problem has been encountered that excellent black display can not be effected, and contrast becomes low.

In order to effect excellent black display, a low reflectance (a ratio of an outgoing light quantity to an incident light quantity as seen from the visible side) needs to be achieved in black display parts at all wavelengths in the visible light region.

However, with the liquid crystal display device described above, explanation is given on its operation in the normally white mode wherein white display is effected in the "off" state when no voltage is applied to the liquid crystal element, and black display is effected in the "on" state when a voltage is applied to the liquid crystal element, However, in the normally white mode, it is difficult to obtain excellent black display, so that nothing but display in low contrast is effected.

Accordingly, in order to obtain excellent black display, a reflection-type liquid crystal display device of the normally black mode was developed, wherein black display is effected in the "off" state when no voltage is applied to the liquid crystal element, and white display is effected in the "on" state when a voltage is applied to the liquid crystal element, as disclosed in, for example, Japanese Patent Laid-open No. H 7-84252 (JP, 07-84252, A).

Even with such a liquid crystal display device as described above, a low reflectance for light rays over all wavelengths can not realized, because an optimization of And value indicating a birefringent tendency of the liquid crystal element, placement angles as well as retardation values of retardation films, and placement angles of polarizing films are not sufficient, so that contrast is insufficient.

Furthermore, with the single polarizing film type conventional liquid crystal display device described in the foregoing, it is not possible to install a backlight because the reflector does not allow light rays to pass therethrough, so that display can not be seen at places where external light is weak or at night.

Accordingly, there has been developed a transflective liquid crystal display device, employing a half-mirror made of a thin film of aluminum formed by the vapor deposition method or the sputtering method, or having a reflector provided with an opening for every pixel, so that display is effected by light rays emitted from a backlight at places where external light is weak or at night.

In the case of the single polarizing film type liquid crystal display device, at the time of reflective display using external light when incident light passes through a liquid crystal element back and forth, the liquid crystal element and optical elements such as a retardation film, and so forth, need to be designed such that display in excellent black and white can be obtained by controlling outgoing of reflected light with a sheet of the polarizing film.

On the other hand, at the time of transmissive display using a backlight, since light emitted from the backlight passes through the liquid crystal element only once, the liquid crystal element and the optical elements need to be designed such that display in excellent black and white can be obtained in such a condition as described above by controlling outgoing of reflected light with one sheet of the polarizing film. For these reasons, it has been difficult to obtain high contrast in both reflective display and transmissive display.

A liquid crystal display device having a reflector provided with an opening for every pixel has been disclosed in, for example, Japanese Patent Laid-open No. H 10-282488 (JP, 10-282488, A), however, no description on the conditions concerning a liquid crystal element and optical elements has been given therein at all, and no description on how to achieve good contrast at the time in both reflective display and transmissive display has been given therein at all.

The invention has been developed in view of the technical background described above, and an object of the invention is to provide a single polarizing film type liquid crystal display device of to realize bright display in high contrast by obtaining excellent black display at low reflectance for light rays over all wavelengths.

Further, it is another object of the invention to provide a single polarizing film type liquid crystal display device, capable of effecting reflective display by use of external light and transmissive display by lighting up a backlight, and achieving high contrast at the time in both reflective display and transmissive display.

DISCLOSURE OF THE INVENTION

In order to achieve the objects described above, the liquid crystal display device according to the invention is a reflection-type liquid crystal display device of single polarizing film type which comprises: an STN liquid crystal cell comprised of a 200° to 260° twist-aligned nematic liquid crystal sandwitched between a first substrate having a reflector and first electrodes and a second substrate having second electrodes; a retardation film disposed on the outer side (a side opposite from the side facing the nematic liquid crystal) of the second substrate of the STN liquid crystal element; and further a polarizing film disposed on the outer side of the retardation film, wherein a Δnd value indicating a birefringent tendency of the STN liquid crystal element is in a range of 0.7 to 0.8 μm, a retardation value R indicating a birefringent tendency of the retardation film is in a range of 0.35 to 0.40 μm, and an intersection angle formed by a phase delay axis of the retardation film and an absorption axis or a transmission axis of the polarizing film is in a range of 30° to 45°.

With the liquid crystal display device described above, reflective electrodes formed of a reflective material can be substituted for the first electrodes, doubling as the reflector, so that the reflector need not be installed separately.

Further, the liquid crystal display device according to the invention comprises an STN liquid crystal element comprised of a 200° to 240° twist aligned nematic liquid crystal sandwiched between a first substrate having a transflective reflector and first electrodes and a second substrate having second electrodes; a first retardation film disposed on the outer side (a side opposite from the side facing the nematic liquid crystal) of the second substrate of the STN liquid crystal element; a first polarizing film disposed on the outer side of the first retardation film; and a second retardation film, a second polarizing film, and a backlight that are disposed in sequence on the outer side of the first substrate of the STN liquid crystal element, thereby constituting a transflective liquid crystal display device.

With the liquid crystal display device described above, a Δnd value indicating birefringent tendency of the STN liquid crystal element is in a range of 0.7 to 0.8 μm, a retardation value of the first retardation film is in a range of 0.35 to 0.40 μm, an intersection angle formed by a phase delay axis of the first retardation film and an absorption axis or a transmission axis of the first polarizing film is in a range of 30° to 45°, and a retardation value of the second retardation film is substantially equivalent to a quarter-wavelength.

With such a liquid crystal display device described above, it is preferable that a third retardation film is installed between the second retardation film and the second polarizing film such that a phase delay axis of the second retardation film crosses a phase delay axis of the third retardation film at about 60°, and a retardation value of the second retardation film is substantially equivalent to a quarter-wavelength while a retardation value of the third retardation film is substantially equivalent to a half-wavelength.

Otherwise, the phase delay axis of the second retardation film may cross the phase delay axis of the third retardation film substantially at right angles, wavelength-dependency of the retardation value of the second retardation film may differ from wavelength-dependency of the retardation value of the third retardation film, and the difference between the retardation value of the second retardation film and the retardation value of the third retardation film may be substantially equivalent to a quarter-wavelength.

Further, the transflective reflector may be a thin metal film with thickness in a range of 0.01 to 0.03 μm or may be a thin metal film provided with an opening corresponding to respective pixels.

With each of the liquid crystal display devices as described above, a diffusion film is preferably installed on the outer side of the second substrate of the STN liquid crystal element.

Further, by installing color filters on a nematic liquid crystal side of the first substrate than the reflector of the STN liquid crystal element, or on the nematic liquid crystal side of the second substrate, the liquid crystal display device is turned into a liquid crystal color display device. If color filters are composed of filters in a plurality of colors, particularly three primary colors, full color display can be effected.

Furthermore, it is desirable that assuming that nx is refractive index in the direction of the phase delay axis of the retardation film, ny is refractive index in the direction orthogonal to the phase delay axis, and nz is refractive index in the direction of thickness thereof, refractive indices of the retardation film has a relationship of nx>nz>ny.

With the liquid crystal display device of the invention described above, the basic constitution of which is the same as that for the conventional reflection-type liquid crystal display device, or the conventional transflective liquid crystal display device of a single polarizing film type, however, the Δnd value of the liquid crystal element, the retardation value of the retardation films, placement angles of the retardation films, and placement angles of the polarizing films, were optimized in the normally black mode wherein high contrast can be obtained, by use of optical simulation and measured data.

As a result, it has been found that when no voltage is applied to the STN liquid crystal element in the case of reflective display, components of linearly polarized light at all wavelengths incoming through the polarizing film are turned into circularly polarized light upon passing through the retardation film and the STN liquid crystal element. The circularly polarized light is reflected at the reflector, and is transmitted again through the STN liquid crystal element and the retardation film, whereupon it reverts to linearly polarized light with the direction of polarization rotated by 90°, and is all absorbed by the polarizing film, so that perfect black display can be effected.

That is, by the agency of the polarizing film, the retardation film, and the STN liquid crystal element incorporating the reflector, black display when no voltage is applied is excellent, and bright white display can be effected because only one the polarizing film is adopted, thereby enabling display in high contrast to be effected. Further, no shadow occurs to display because the reflector is contained in the STN liquid crystal element.

Meanwhile, with the transflective liquid crystal display device according to the invention, in the case of transmissive display when the backlight is lit up, light emitted from the backlight is transmitted through the second polarizing film and the second retardation film having the retardation value equivalent to a quarter-wavelength that are installed on the underside of the STN liquid crystal element, and falls on the nematic liquid crystal after passing through the transflective reflector inside the STN liquid crystal element.

As described hereinbefore, since the retardation value and the placement angle of the first retardation film are optimized, a composite retardation value of the liquid crystal element and the first retardation film is rendered equivalent to a quarter-wavelength for nearly all wavelengths. Accordingly, by disposing the second retardation film on the underside of the STN liquid crystal element such that a retardation value thereof is subtracted by the retardation value of the STN liquid crystal element, birefringence can be eliminated, and the light emitted from the backlight is transmitted through the second polarizing film installed on the underside of the STN liquid crystal element, whereupon the light is turned into linearly polarized light with the direction of polarization rotated to the transmission axis of the second polarizing film, outgoing as it is from the first retardation film.

Accordingly, as the absorption axis of the first polarizing film on the visible side crosses the absorption axis of the second polarizing film on the side of the backlight at right angles, excellent black display can be effected.

In a state where a voltage is applied to the STN liquid crystal element, the birefringency of the STN liquid crystal element undergo changes, so that excellent white display can be effected at the time of reflective display as well as transmissive display, thereby enabling display in high contrast to be effected at both the time of reflective display and the time of transmissive display.

BEST MODE FOR CARRYING OUT THE INVENTION

Preferred embodiments of a liquid crystal display device according to the invention will be described in detail hereinafter with reference to the accompanying drawings.

First Embodiment: FIGS. 1 to 3, FIGS. 10 and 13

A first embodiment of a liquid crystal display device according to the invention is described with reference to FIGS. 1 and 2.

Figure 1:
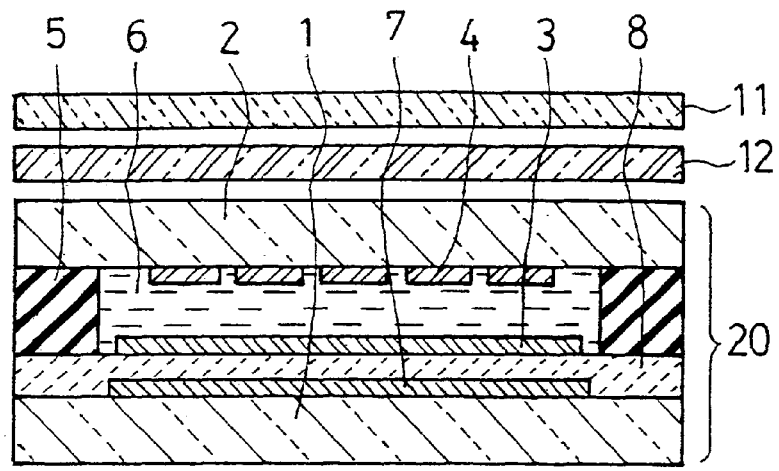
FIG. 1 is a schematic sectional view showing the constitution of a first embodiment of a liquid crystal display device according to the invention.
Figure 2:
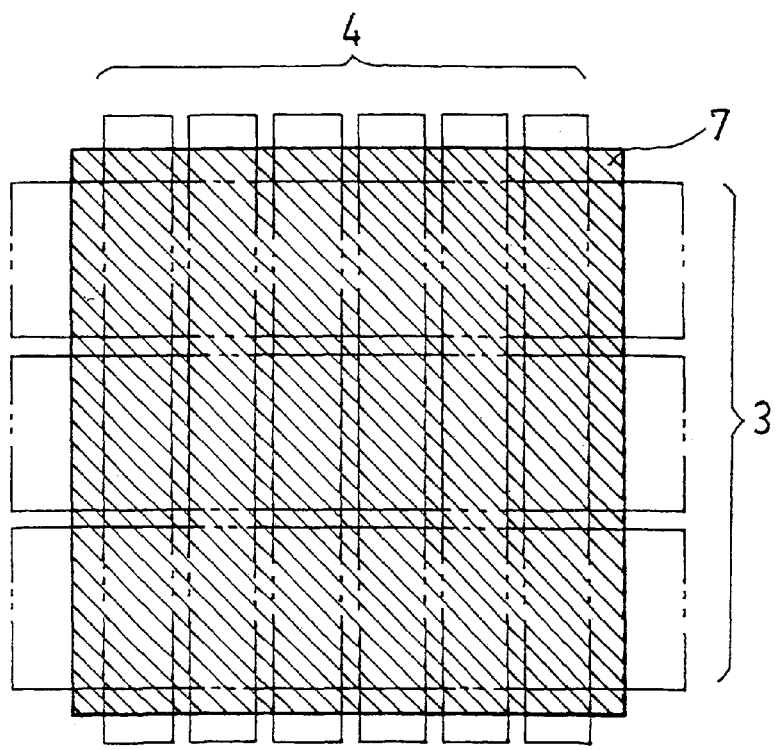
FIG. 2 is a plan view showing a planar configuration among a reflector, first electrodes, and second electrodes of the liquid crystal display device.

FIG. 1 is a schematic sectional view showing the constitution of the liquid crystal display device, and FIG. 2 is a plan view showing a planar configuration among a reflector, first electrodes, and second electrodes, installed in the device.

As shown in FIG. 1, the liquid crystal display device is comprised of an STN liquid crystal element 20, and a retardation film 12 disposed on the outer side (a side opposite from the side facing nematic liquid crystal: the visible side) of a second substrate 2 of the STN liquid crystal element 20, and a polarizing film 11 disposed on the outer side of the retardation film 12, thereby constituting a reflection-type liquid crystal display device of single polarizing film type.

The polarizing film 11 and the retardation film 12 are integrally bonded with each other by use of an acrylic resin based adhesive, and are pasted to the outer face of the second substrate 2 of the STN liquid crystal element 20 by use of an acrylic resin based adhesive.

The STN liquid crystal element 20 is comprised of: a first substrate 1 and the second substrate 2, made up of a glass sheet 0.5 mm thick, respectively, and bonded with each other at the periphery thereof with a sealant 5: and 240° counterclockwise twist-aligned nematic liquid crystal 6 sealed in a gap formed therebetween to be held therein-between.

On the inner face of the first substrate 1, a reflector 7 made of aluminum 0.2 μm thick, and a protective film 8 made of an acrylic material 2 μm thick, covering the reflector 7, are formed, and first electrodes 3 are formed further on top of the protective film 8.

On the inner face of the second substrate 2, second electrodes 4 are formed. Both the first electrodes 3 and the second electrodes 4 are made up of an indium tin oxide (ITO) film which is a transparent and electrically conductive film, and are patterned in a multitude of stripes in such a way as to cross each other at right angles. Spots where the first electrodes 3 and the second electrodes 4 cross and superpose each other, respectively, constitute respective pixels. An alignment film (although not shown) is formed on the protective film 8 of the first substrate 1 with the first electrodes 3 formed thereon, and on the inner face of the second substrate 2 with the second electrodes 4 formed thereon, respectively.

Transmittance of the first electrodes 3 and the second electrodes 4, made up of the ITO film, is important in respect of brightness. The lower a sheet resistance value of the ITO film, the thicker the thickness of the film becomes, thereby lowering reflectance.

With this embodiment, data signals are applied to the second electrodes 4, and accordingly, an ITO film having a sheet resistance value at about 100 ohms, and a thickness in the order of 0.05 μm is used for the second electrodes 4 so that the effect of cross talk can be reduced. An average transmittance of the ITO film is about 92%.

Further, scanning signals are applied to the first electrodes 3, and accordingly, an ITO film having a sheet resistance value at about 10 ohms, and a thickness in the order of 0.3 μm is used for the first electrodes 3 in order to reduce cross talk. An average transmittance of the ITO film is a little lower at about 89%, however, brightness of images in display can be improved by use of a transparent electrode having a transmittance at 90% or more for at least one of the electrodes.

The polarizing film 11 is preferably as bright as possible, and its polarization degree is preferably as high as possible. With this embodiment, material having a polarization degree of 99.9% at a transmittance of 45% is used for the polarizing film.

If an anti-reflection layer having reflectance in the order of 0.5% is provided by coating the surface of the polarizing film 11 with inorganic thin films in a plurality of layers, each having different reflectance, by use of the vapor deposition method or the sputtering method, surface reflectance of the polarizing film 11 is lowered so that brightness of images is enhanced. Also, since a blackness level is lowered, contrast is improved as well.

However, since the inorganic thin films is expensive, there has been developed a coat type anti-reflection layer coated with an organic material in one to two layers. Such an anti-reflection layer has a somewhat high reflectance around 1%, however, its price is low. The above-described anti-reflection layer is good enough for use as the anti-reflection layer of the liquid crystal display device.

The retardation film 12 is a transparent film about 70 μm thick, formed by drawing polycarbonate (PC), and has a retardation value R of 0.39 μm at a wavelength of 0.55 μm.

For the retardation film 12, a so-called Z type retardation film is used, wherein refractive indices thereof have a relationship as expressed by the formula:

$$nx > nz > ny$$

where nx is a refractive index in the direction of a phase delay axis thereof, ny is a refractive index in the direction orthogonal to the phase delay axis, and nz is a refractive index in the direction of thickness thereof.

Use of the Z type retardation film is preferable because of improvement in viewing angle characteristics, however, an ordinary retardation film having a relationship of nx>ny=nz can evidently be used as well Hereinafter, a configuration among respective constituent members of the liquid crystal display device is described with reference to FIG. 3.

Figure 3:
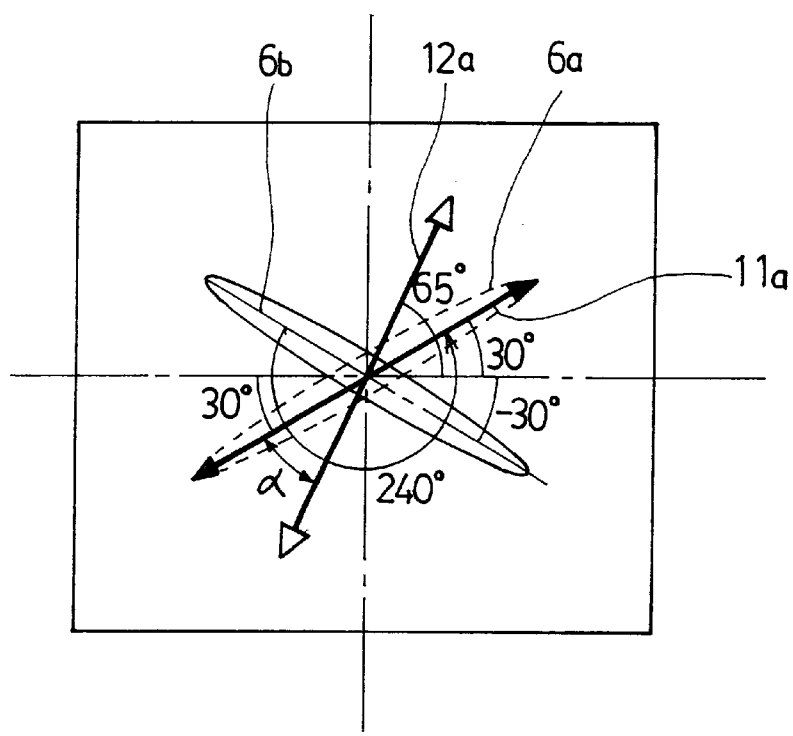
FIG. 3 is a schematic illustration showing a relationship among the direction of an absorption axis of a polarizing film, the direction of a phase delay axis of a retardation film and a twist angle of nematic liquid crystal of an STN liquid crystal element of the liquid crystal display device.

An alignment film (not shown) is formed on the surface of the first electrodes 3 as well as the second electrodes 4 of the STN liquid crystal element 20, and as shown in FIG. 3, a lower molecular alignment direction 6a of the nematic liquid crystal 6 points at +30° by applying a rubbing treatment to the inner face of the first substrate 1 in the direction extending upward to the right at 30° to the horizontal axis while an upper molecular alignment direction 6b of the nematic liquid crystal 6 points at −30° by applying a rubbing treatment to the inner face of the second substrate 2 in the direction extending downward to the right at 30° to the horizontal axis. Generally, an angle of clockwise rotation is expressed in minus, and an angle of counterclockwise rotation is expressed in plus.

The STN liquid crystal element 20 having a twist angle Ts of 240° counterclockwise is made up by adding an optical rotatory substance called chiral to the nematic liquid crystal 6 having a viscosity at 20 cp, and adjusting a twist pitch P to 11 μm.

A birefringence difference Δn of the nematic liquid crystal 6 to be used is set at 0.131, and clearance between the first substrate 1 and the second substrate 2, that is, a cell gap d is set at 5.8 μm. Accordingly, a Δnd value Rs indicating a birefringent tendency of the STN liquid crystal element 20 as expressed by the product of the birefringence difference Δn of the nematic liquid crystal 6 and the cell gap d becomes 0.76 μm.

The polarizing film 11 is disposed such that an absorption axis 11a thereof is at +30° on the basis of the horizontal axis, and the retardation film 12 is disposed such that a phase delay axis 12a thereof is at +65° on the basis of the horizontal axis Consequently, an intersection angle α formed by the absorption axis 11a of the polarizing film 11 and the phase delay axis 12a of the retardation film 12 becomes 35°.

Herein, the effect of the liquid crystal display device according to the first embodiment of the invention is described hereinafter by referring to FIGS. 10 to 13 as well.

Figure 10:
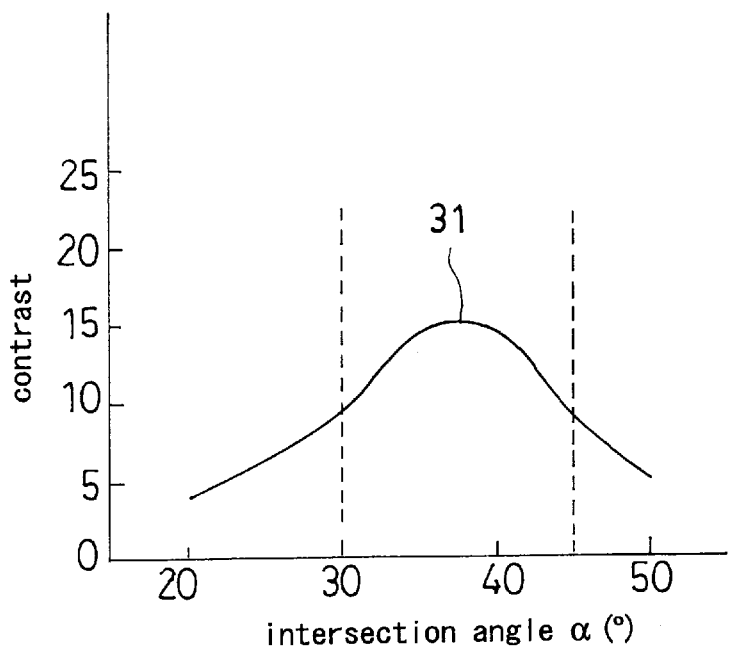
FIG. 10 is a diagram illustrating a relationship between an intersection angle formed by the phase delay axis of the retardation film and the absorption axis of the polarizing film, and contrast of the liquid crystal display device according to the invention.

First, the effects of the intersection angle α formed by the absorption axis 11a of the polarizing film 11 and the phase delay axis 12a of the retardation film 12 is described. FIG. 10 is a diagram showing a relationship between the intersection angle α formed by the absorption axis 11a of the polarizing film 11 and the phase delay axis 12a of the retardation film 12 and contrast of display effected by the liquid crystal display device., a curve 31 indicating contrast.

As is evident from the figure, the highest contrast can be obtained with the intersection angle α in a range of 35° to 40°, but good contrast can not be obtained at 30° or less or at 45° or more, although good contrast can be obtained with the intersection angle α even in a range of 30° to 45°.

It has been discovered from the results of examinations wherein the polarizing film 11 and the retardation film 12 were concurrently rotated relative to the STN liquid crystal element 20 with the intersection angle α fixed at 35° that good contrast was obtained at placement angles in a range of ±10° relative to the placement angle of these films according to this embodiment, indicating that the intersection angle α is more important than the absolute value of the placement angle.

The effect of the Δnd value indicating the birefringent tendency of the STN liquid crystal element 20 is described hereinafter.

Figure 11:
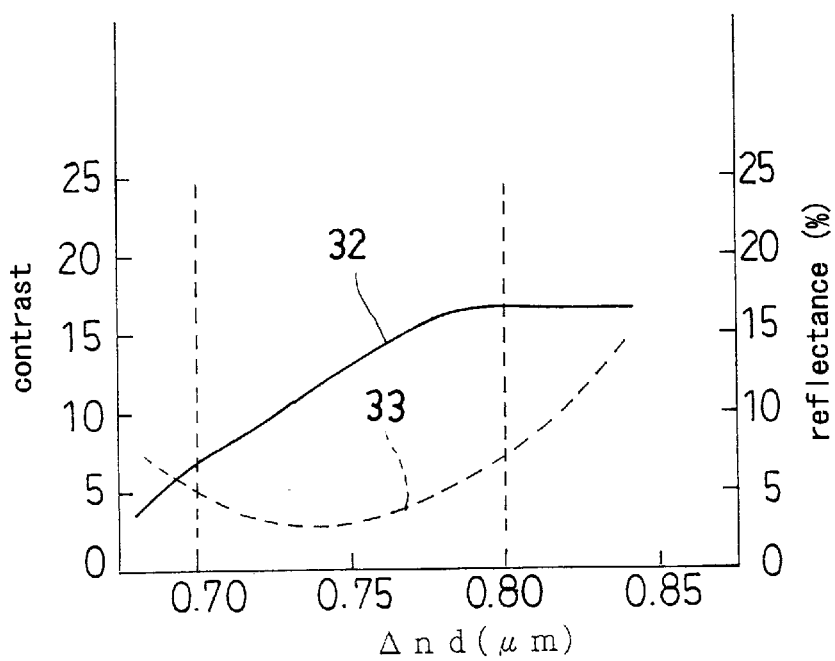
FIG. 11 is a diagram illustrating a relationship among Δnd value of the STN liquid crystal element, contrast, and reflectance of black display the liquid crystal display device.

FIG. 11 is a diagram showing a relationship between the Δnd value of the STN liquid crystal element 20 and contrast as well as reflectance of black display when no voltage is applied, a curve 32 indicating contrast, and a curve 33 reflectance at black display.

The greater the Δnd value of the STN liquid crystal element 20, the higher the contrast becomes, but the contrast reaches the saturation level with the Δnd value at 0.78 μm or greater.

However, in the "off" state when no voltage is applied, the reflectance of black display becomes the lowest when the Δnd value is around 0.75 μm. Accordingly, good contrast is obtained when the Δnd value of the STN liquid crystal element 20 is in a range of 0.70 to 0.80 μm, and particularly, the Δnd value in a range of 0.75 to 0.78 μm is preferable.

Figure 12:
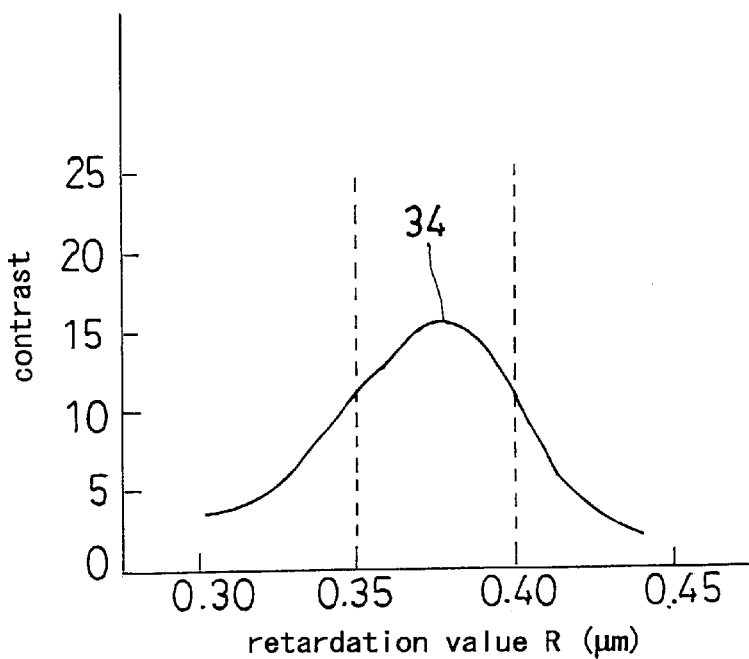
FIG. 12 is a diagram illustrating a relationship between a retardation value R of the retardation film and contrast of the liquid crystal display device according to the invention.

The effect of a retardation value R of the retardation film 12 is described hereinafter. FIG. 12 is a diagram showing a relationship between the retardation value R of the retardation film 12 and contrast, a curve 34 indicating contrast. As is evident from the figure, the highest contrast is obtained with the retardation value R in a range of 0.38 to 0.39 μm, however, excellent contrast can not be obtained with the retardation value R 0.35 μm or less, or 0.40 μm or more, although good contrast can be obtained even with the retardation value R in a range of 0.35 to 0.40 μm.

Thus, by closely optimizing the intersection angle α formed by the absorption axis 11a of the polarizing film 11 and the phase delay axis 12a of the retardation film 12, the retardation value R of the retardation film 12, and the Δnd value of the STN liquid crystal element 20, perfect black display can be effected in the "off" state.

Figure 13:
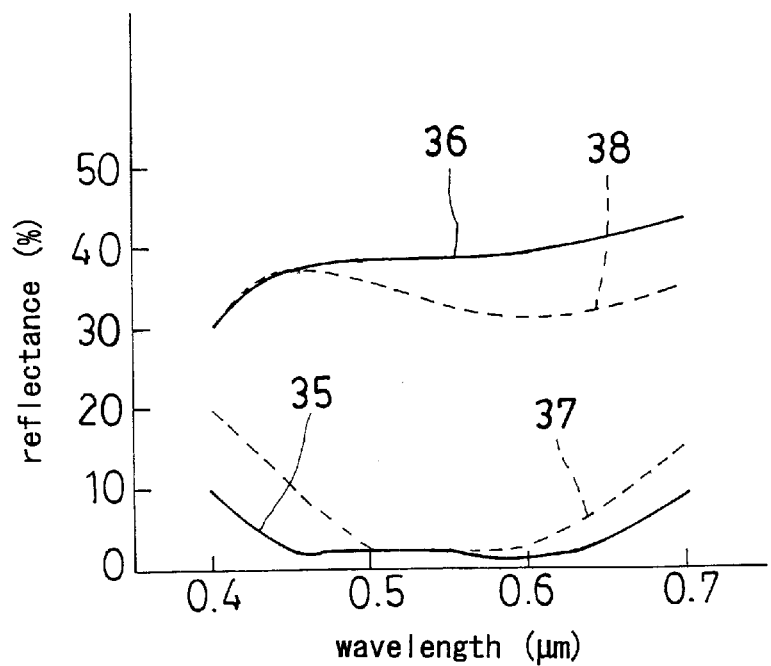
FIG. 13 is a diagram showing comparison of a spectral reflectance curve of the reflection-type liquid crystal display device according to the invention with that of the conventional reflection-type liquid crystal display device.

FIG. 13 shows reflection characteristics of the single polarizing film type liquid crystal display device according to this embodiment. A curve 35 indicates reflectance of black display when no voltage is applied, and a curve 36 reflectance of white display when a voltage is applied.

For the sake of comparison, a trial model of the single polarizing film type liquid crystal display device for normally black mode described in the first embodiment disclosed in Japanese Patent Laid-open No. H 7-84252 (JP, 07-84252, A) was prepared and evaluated. As a comparative example, reflectance of black display thereof is shown by a curve 37 indicated by a broken line, and reflectance of white display thereof is shown by a curve 38 by a broken line. With the comparative example, a twist angle of nematic liquid crystal in an STN liquid crystal element is 240°, a Δnd value is 0.65 μm, and a retardation value R of a retardation film is 0.35 μm.

With the liquid crystal display device according to the first embodiment of the invention, linearly polarized light falling thereon through the polarizing film 11 from the upper visible side in FIG. 1 is turned into circularly polarized light at all wavelengths in the visible light region upon passing through the retardation film 12 and the STN liquid crystal 6 of the STN liquid crystal element 20. Since the first electrodes 3 and the protective film 8 have no birefringent tendency, the circularly polarized light undergoes no change in polarization state, and arrives at the reflector 7 as it is.

The circularly polarized light reflected at the reflector 7 reverts to linearly polarized light with the direction of polarization rotated through 90° when passing through the nematic liquid crystal 6 and the retardation film 12, and the linearly polarized light is all absorbed by the polarizing film 11, so that excellent black display at low reflectance substantially across the entire visible light region as indicated by the curve 35 in FIG. 13 can be obtained.

In the case of the comparative example as indicated by the curve 37 in FIG. 13, when no voltage is applied, light components in the short wavelength range as well as the long wavelength range are leaked, and thereby reflectance goes up, so that excellent black display can not be effected, and black display is turned into purple display, thus lowering contrast.

When a predetermined voltage is applied between the first electrodes 3 and the second electrodes 4 inside the STN liquid crystal element 20, the liquid crystal molecules of the nematic liquid crystal 6 are caused to rise, and a effective Δnd value of the STN liquid crystal element 20 decreases. Consequently, the linearly polarized light falling through the polarizing film 11 is not turned into perfect circularly polarized light even after passing through the retardation film 12 and the nematic liquid crystal 6, but turned into elliptically polarized light or linearly polarized light When a birefringent tendency occurring in the nematic liquid crystal 6 by applying the voltage is set to as much as a quarter wavelength film, the linearly polarized light falling from the polarizing film 11 and reflected by the reflector 7 is not rotated and returns as it is, so that reflectance becomes high substantially across the entire visible light region, as indicated by the curve 36 in FIG. 13, and bright and excellent white display can be obtained.

In the case of the comparative example shown by the curve 38 in FIG. 13, as reflectance of white display on the longer wavelength side became lower when no voltage was applied, excellent white display could not be effected, and darkish white display tinged with blue was shown.

Thus, with the use of the polarizing film 11, the retardation film 12, and the STN liquid crystal element 20 incorporating the reflector 7, and by setting the Δnd value of the STN liquid crystal element 20 in a range of 0.7 to 0.8 μm, the retardation value R of the retardation film 12 in a range of 0.35 to 0.40 μm, and the intersection angle α formed by the absorption axis 11a of the polarizing film 11 and the phase delay axis 12a of the retardation film 12 in a range of 30° to 45°, excellent black display can be obtained, thereby enabling bright display in high contrast to be effected.

Figure 4:
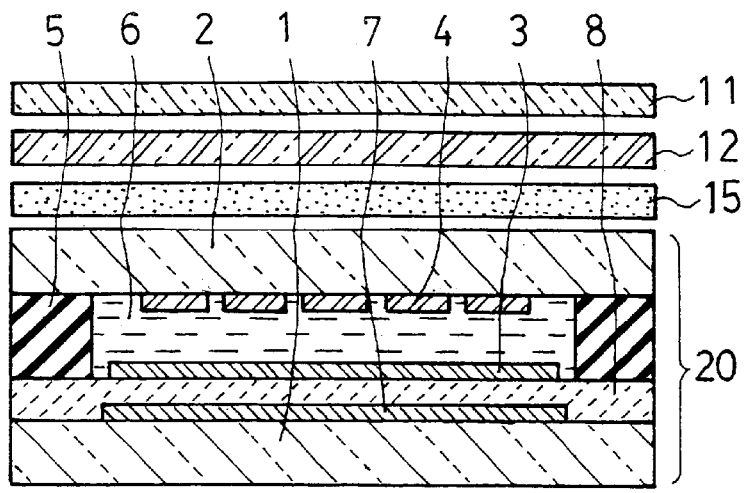
FIG. 4 is a schematic sectional view showing an embodiment implemented by partially altering the constitution of the liquid crystal display device shown in FIG. 1.

Variations of the First Embodiment: FIG. 4

With the first embodiment described in the foregoing, the angle formed by the absorption axis 11a of the polarizing film 11 and the phase delay axis 12a of the retardation film 12 is defined as the intersection angle α. Even if the polarizing film 11 is rotated by 90°, similar display characteristics can be obtained although there will be a little change in a viewing angle characteristic.

Accordingly, if an angle formed by a transmission axis of the polarizing film 11 and the phase delay axis 12a of the retardation film 12 is defined as an intersection angle β, excellent display characteristics can be also obtained with the intersection angle β in a range of 30° to 45°.

With this embodiment, for the STN liquid crystal element 20, the 240° twisted STN liquid crystal element is used, however, even with the use of STN liquid crystal element having a twist angle in a range of 200° to 260°, a similar reflection-type liquid crystal display device can be obtained by adjusting a placement angle of the polarizing film 11 and the retardation film 12 relative to such an STN liquid crystal element, while keeping the intersection angle β formed by the polarizing film 11 and the retardation film 12 as above.

Further, for the retardation film 12, a film formed by drawing polycarbonate is used, however, by use of a temperature-compensation type retardation film formed by drawing a film containing liquid crystal, and having a retardation value which varies depending on temperature, brightness and contrast of display are improved at high or low temperatures, so that a better reflection-type liquid crystal display device can be implemented.

The reflector 7 of the STN liquid crystal element is installed on the inner face of the first substrate 1, however, even in the case of the reflector 7 being installed on the outer side of the first substrate 1, a similar effect can be obtained as for contrast of display although shadows occurs to display.

Further, as shown in FIG. 4, by installing a diffusion film 15 between the second substrate 2 of the STN liquid crystal element 20 and the retardation film 12, light rays reflected at the reflector 7 is scattered, thereby enabling bright display having a wide viewing angle to be effected. Incident light rays entering from outside preferably undergo forward scattering as much as possible before transmitted with less backward scattering because higher contrast can be obtained in this way.

Figure 5:
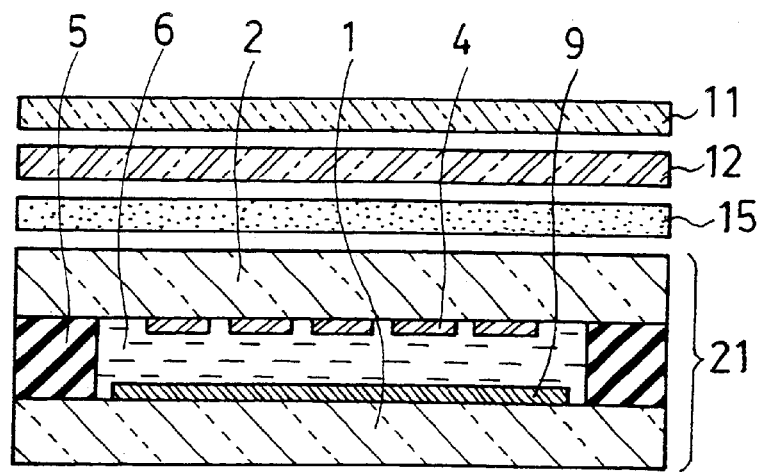
FIG. 5 is a schematic sectional view showing the constitution of a second embodiment of a liquid crystal display device according to the invention.
Figure 6:
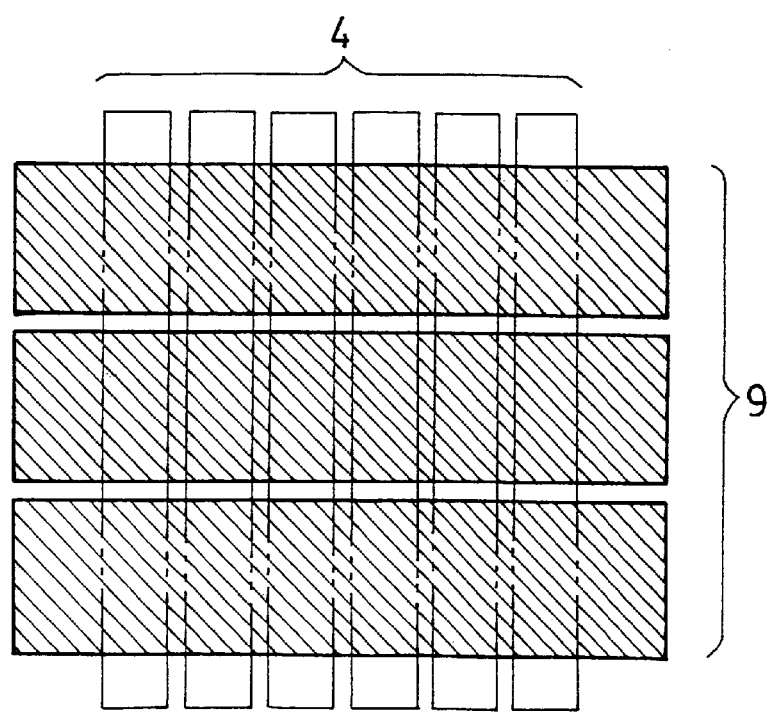
FIG. 6 is a plan view showing a planar configuration between reflective electrodes and second electrodes of the liquid crystal display device.
Figure 7:
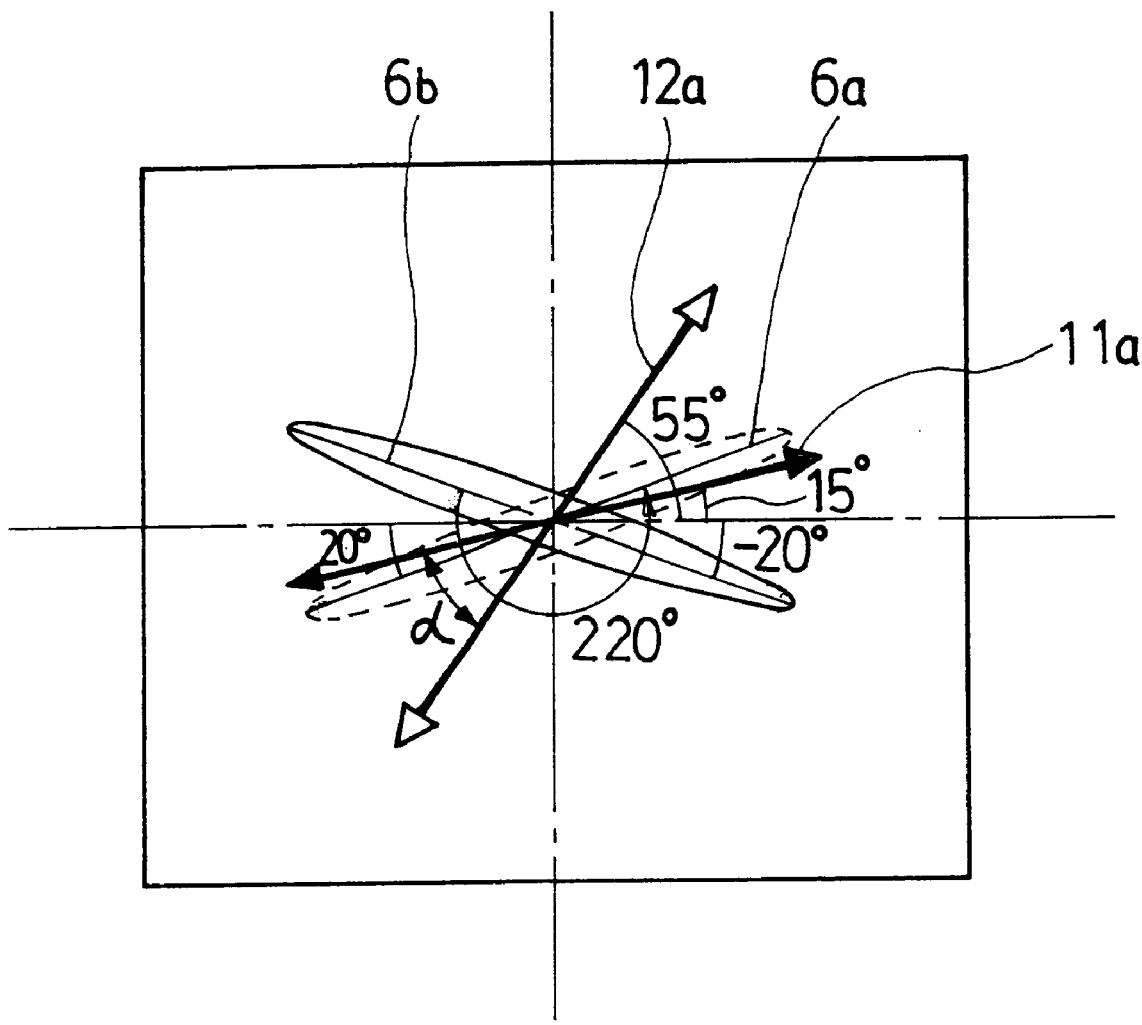
FIG. 7 is a schematic illustration showing a relationship among the direction of a absorption axis of a polarizing film, the direction of a phase delay axis of a retardation film and a twist angle of nematic liquid crystal of an STN liquid crystal element of the liquid crystal display device.

Second Embodiment: FIGS. 5 to 7

A second embodiment of a liquid crystal display device according to the invention is described hereinafter with reference to FIGS. 5 to 7.

First, the constitution of the liquid crystal display device is described with reference to FIGS. 5 and 6. These figures are similar to FIGS. 1 and 2 for the first embodiment described above, and parts corresponding to those in FIGS. 1 and 2 are denoted by the like reference numerals, and description thereof is simplified or omitted.

The liquid crystal display device according to the second embodiment also constitutes a reflection-type liquid crystal display device of single polarizing film type, and differs from the constitution of the first embodiment of the invention only in respect of the constitution of an STN liquid crystal element, placement angles of a retardation film and a polarizing film, and installation of a diffusion film.

An STN liquid crystal element 21 of the liquid crystal display device incorporates reflective electrodes 9 made of aluminum 0.2 μm, thick, formed directly on the inner face of a first substrate 1 thereof, the reflector 7 and the protective film 8 shown in FIG. 1 are not installed, and nematic liquid crystal 6 is 220° counterclockwise twist aligned and differs from the STN liquid crystal element 20 according to the first embodiment only in these respects.

The reflective electrodes 9 have the surface thereof serving as a reflection face, and serves as both the first electrodes 3 and the reflector 7, shown in FIGS. 1 and 2. As shown in FIG. 6, the reflective electrodes 9 are patterned in stripes running in the direction orthogonal to respective second electrodes 4 which are transparent and patterned in stripes, and spots where the reflective electrodes 9 and the second electrodes 4 cross and superpose each other, respectively, constitute respective pixels.

As shown in FIG. 5, on the outer side of a second substrate 2 of the STN liquid crystal element 21, a diffusion film 15, a retardation film 12, and a polarizing film 11 are disposed in sequence, and the polarizing film 11 and the retardation film 12 are integrally bonded with each other with an acrylic resin based adhesive.

The diffusion film 15 is installed to obtain bright display having a wide viewing angle by scattering light rays reflected by the reflective electrodes 9.

Incident light rays entering from outside preferably undergo forward scattering as much as possible before transmitted with less backward scattering because higher contrast can be obtained in this way. In this case, a light scattering type adhesive 30 μm thick, composed of fine particles mixed in an adhesive, is used for the diffusion film 15, doubling as an adhesive for bonding of the retardation film 12 with the second substrate 2.

The polarizing film 11 is the same as that used in the first embodiment.

The retardation film 12 is a transparent film about 70 μm thick, formed by drawing polycarbonate (PC), and has a retardation value R=0.39 μm at a wavelength of 0.55 μm. A relationship among refractive indices thereof, in various angular directions, is the same as those for the first embodiment.

Hereinafter, a planar configuration of respective constituent members of the liquid crystal display device is described with reference to FIG. 7.

An alignment film (not shown) is formed on the surface of the reflective electrodes 9 as well as the second electrodes 4 of the STN liquid crystal element 21, and a lower molecular alignment direction 6a of the nematic liquid crystal 6 points at +20° by applying a rubbing treatment to the side of the first substrate 1 in the direction extending upward to the right at 20° to the horizontal axis while an upper molecular alignment direction 6b of the nematic liquid crystal 6 points at −20° by applying a rubbing treatment to the side of the second substrate 2 in the direction extending downward to the right at 20° to the horizontal axis. The STN liquid crystal element 21, twisted by 220° counterclockwise, is made up by adding an optical rotatory substance called chiral to the nematic liquid crystal having a viscosity at 20 cp, and adjusting a twist pitch P to 11 μm.

A birefringence difference Δn of the nematic liquid crystal 6 to be used is set at 0.131, and clearance between the first substrate 1 and the second substrate 2, that is, a cell gap d is set at 5.8 μm. Accordingly, a Δnd value indicating a birefringent tendency of the STN liquid crystal element 21 as expressed by the product of the birefringence difference Δn of the nematic liquid crystal 6 and the cell gap d becomes 0.76 μm.

The polarizing film 11 is disposed such that an absorption axis 11a thereof is at an angle of +15° on the basis of the horizontal axis. The retardation film 12 is disposed such that a phase delay axis 12a thereof is at an angle of +55° on the basis of the horizontal axis, and an intersection angle α formed by the absorption axis 11a of the polarizing film 11 and the phase delay axis 12a of the retardation film 12 becomes 40°.

Herein, advantageous effects of the liquid crystal display device according to this embodiment is described.

First, as for placement angles of the polarizing film 11 and the retardation film 12, the placement angle of the retardation film 12 is altered from that for the first embodiment such that the phase delay axis 12a of the retardation film 12 is at an angle of +55° on the basis of the horizontal axis, however, the effect of an intersection angle α formed by the absorption axis 11a of the polarizing film 11 and the phase delay axis 12a of the retardation film 12 shows substantially the same tendency as that for the first embodiment. More specifically, the highest contrast can be obtained with the intersection angle α in a range of 38° to 43°, but excellent contrast can not be obtained at 30° or less or at 45° or more although good contrast can be obtained with the intersection angle α even in a range of 30° to 45°.

The effect of a Δnd value of the STN liquid crystal element 21 as well has substantially the same tendency as that for the first embodiment, that is, the greater the Δnd value of the STN liquid crystal element 21, the higher the contrast becomes.

However, in the "off" state when no voltage is applied, the reflectance of black display becomes the lowest when the Δnd value is around 0.75 μm. Accordingly, good contrast is obtained when the Δnd value of the STN liquid crystal element 21 is in a range of 0.70 to 0.80 μm, and particularly, the Δnd value in a range of 0.75 to 0.77 μm is preferable.

Next, the effect of a retardation value R of the retardation film 12 is described hereinafter. The STN liquid crystal element 21 has a twist angle of 220°, smaller than a twist angle of 240° for the fist embodiment.

Accordingly, the retardation value R of the retardation film 12 is preferably slightly smaller than that for the fist embodiment, and high contrast can be obtained with the retardation value R in a range of 0.35 to 0.36 μm, however, good contrast can not be obtained with the retardation value R at 0.34 μm or less, or at 0.40 μm or more.

Thus, by optimizing the intersection angle α formed between the retardation film 12 and the polarizing film 11, the retardation value R of the retardation film 12, and the Δnd value of the STN liquid crystal element 21, perfect black display can be effected in the "off" state.

The diffusion film 15 need only be disposed on the outer side (the visible side) of the second substrate 2 of the STN liquid crystal element, and may be disposed between the retardation film 12 and the polarizing film 11, or on the surface of the polarizing film 11 on the visible side. However, the diffusion film 15 is preferably disposed as close to the second substrate 2 as possible in order to reduce display blurring.

Further, since the second substrate 2 is preferably as thin in thickness as possible so as to reduce display blurring, thickness thereof is set at 0.5 μm in this embodiment.

With the liquid crystal display device according to this embodiment, operation for reflective display by external light falling from the upper visible side in FIG. 5 is the same as for the first embodiment described in the foregoing, and description thereof is therefore omitted.

With this embodiment, by use of the polarizing film 11, the retardation film 12, and the STN liquid crystal element 21 incorporating the reflective electrodes 9, and by setting the Δnd value of the STN liquid crystal element 21 in a range of 0.70 to 0.80 μm, the retardation value R of the retardation film 12 in a range of 0.35 to 0.40 μm, and the intersection angle α formed by the absorption axis 11a of the polarizing film 11 and the phase delay axis 12a of the retardation film 12 in a range of 30° to 45°, excellent black display can be obtained, thereby enabling bright display in high contrast to be effected.

Variations of the Second Embodiment

With this embodiment as well, an angle formed by the absorption axis 11a of the polarizing film 11 and the phase delay axis 12a of the retardation film 12 is defined as an intersection angle α. Even if the polarizing film 11 is rotated through 90°, similar display characteristics can be obtained although there will be a little change in a viewing angle characteristic. Accordingly, if an angle formed by a transmission axis of the polarizing film 11 and the phase delay axis 12a of the retardation film 12 is defined as an intersection angle β, excellent display characteristics can be obtained with the intersection angle β even in a range of 30° to 45°.

For the STN liquid crystal element 21, the 220° twisted nematic liquid crystal element are used, however, even with the use of STN liquid crystal element having a twist angle in a range of 200° to 260°, a similar reflection-type liquid crystal display device can be obtained by adjusting a placement angle of the polarizing film 11 and the retardation film 12 relative to such STN liquid crystal element while keeping the intersection angles formed by the polarizing film 11 and the retardation film 12 as above.

Further, with this embodiment, for the retardation film 12, use is made of an ordinary type retardation film formed by uniaxial drawing of polycarbonate (PC) such that a relationship among refractive index nz in the direction of z axis, refractive index nx in the direction of the phase delay axis, and refractive index ny in the direction orthogonal to the phase delay axis is expressed by the following formula:

$$nx>ny=nz$$

However, the same effect can be obtained even with the use of a so-called Z type retardation film formed by multiaxial drawing of polycarbonate (PC) such that the relationship can be expressed by the formula, nx>nz>ny, or a retardation film formed by drawing material such as polyvinylalcohol (PVA), polypropylene (PP), acrylic resin, polystyren, and so forth.

Figure 8:
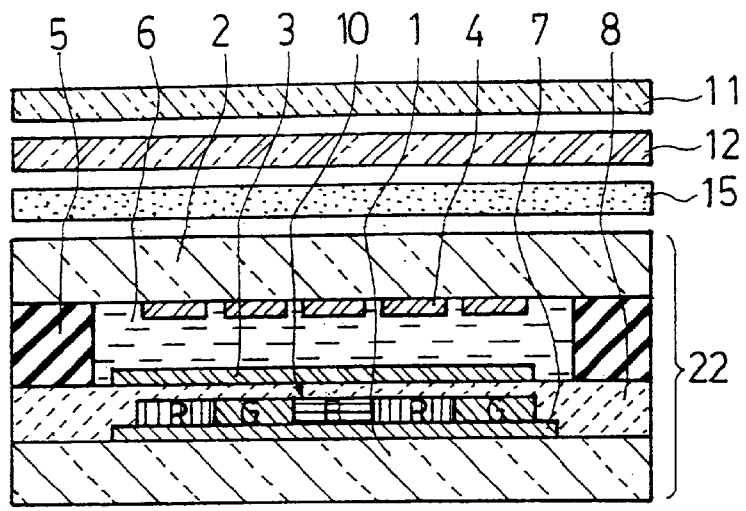
FIG. 8 is a schematic sectional view showing the constitution of a third embodiment of a liquid crystal display device according to the invention.
Figure 9:
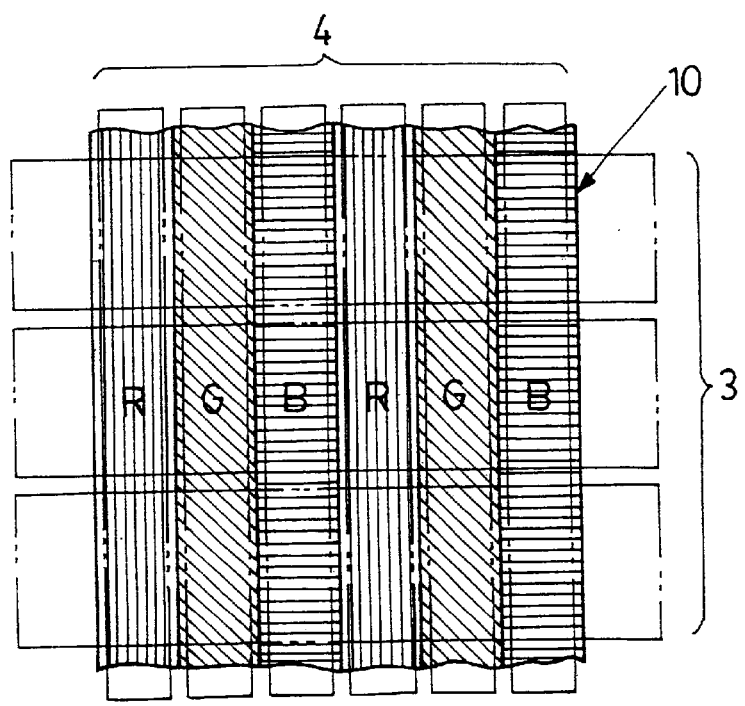
FIG. 9 is a plan view showing a planar configuration among color filters, first electrodes, and second electrodes of the liquid crystal display device shown in FIG. 8.

Third Embodiment: FIGS. 8 and 9

A third embodiment of a liquid crystal display device according to the invention is described hereinafter with reference to FIGS. 8 and 9.

FIG. 8 is a schematic sectional view showing the constitution of the liquid crystal display device, and FIG. 9 is a plan view showing a planar configuration among color filters and first as well as second electrodes (shown by phantom lines) of an STN liquid crystal element. In the figures, parts corresponding to those in FIGS. 1, 2, and 4 are denoted by the like reference numerals.

With this embodiment, a configuration among the STN liquid crystal element, an absorption axis of a polarizing film, and a phase delay axis of a retardation film is the same as that for the first embodiment described with reference to FIG. 3, and accordingly, description thereof by referring to a figure is omitted.

The liquid crystal display device according to the third embodiment differs in constitution from the first embodiment in that the color filters 10 are installed between the reflector 7 and the first electrodes 3 inside the STN liquid crystal element 20, thereby enabling color display to be effected.

With the liquid crystal display device, the STN liquid crystal element 22 is provided with the 1 $\mu$m thick color filters 10 on the 0.2 $\mu$m thick reflector 7 made of aluminum provided on the inner face of the first substrate 1 thereof. The color filters 10 are comprised of filters in three colors, red filters R, green filters G, and blue filters B, and as shown in FIG. 9, are formed in alternate and parallel stripes so as to correspond to respective second electrodes 4 patterned in stripes, formed on the inner face of the second substrate 2. The respective color filters R, G, B are formed to have a width wider than that of the respective second electrodes 4 so as not have a gap therebetween. It is not desirable that there exists a gap between the respective color filters 10 because this will cause white light to be mixed with display colors, and degrade color purity although a quantity of incident light is increased and display of images becomes brighter.

The constitution of the liquid crystal element 22, in other respects, is the same as that of the liquid crystal element 20 shown in FIG. 1, and description thereof is therefore omitted.

As with the liquid crystal display device shown in FIG. 4, on the outer side of the second substrate 2 of the STN liquid crystal element 22, a diffusion film 15, a retardation film 12, and a polarizing film 11 are disposed in sequence. This embodiment is the same as the first embodiment in respect of the constitution of the respective films described above, bonding of the respective films with each other with an acrylic resin based adhesive, and use of a light scattering adhesive for the diffusion film 15.

For improvement of brightness, the color filters 10 preferably have the maximum transmittance at an optical spectrum, as high as possible, and the respective color filters preferably have the maximum transmittance of 80% or more, most preferably 90% or more. Further, the minimum transmittance thereof, at an optical spectrum, need be as high as 20 to 50%.

For the color filters 10, various types such as a pigment dispersion type, a dyeing type, a printing type, a transfer type, a electrodeposition type and so forth can be used, however, a color filter of the pigment dispersion type, made by dispersing a pigment in an acrylic or PVA based photosensitive resin, is most preferable because of heat resistance at high temperatures and high color purity.

For obtaining the color filters 10 having a high transmittance, the reflector 7 made up of a thin aluminum film was formed on the inner face of the first substrate 1, the surface of the reflector 7 was inactivated by anodizing, subsequently a color resist with 10 to 15% of a pigment blended with photosensitive resin was applied to the inner face of the first substrate 1 by use of a spinner, and a exposure and development treatment was applied thereto, whereupon the 1 $\mu$m thick color filters 10 having a high transmittance was obtained.

Herein, the effect of the liquid crystal display device according to the third embodiment is described.

As described with reference to the first embodiment, in the "off" state when no voltage is applied between the first electrodes 3 and the second electrodes 4 of the STN liquid crystal element 22 (the STN liquid crystal element 20 in the case of the first embodiment), excellent black display can be effected.

When linearly polarized light falling on the liquid crystal device through the polarizing film 11 from the upper visible side in FIG. 8 is transmitted through the retardation film 12 and nematic liquid crystal 6, components of the linearly polarized light at all wavelengths in the visible light region are turned into circularly polarized light.

Since the first electrodes 3, a protective film 8, and the color filters 10 have no birefringent tendency at all, the circularly polarized light undergoes no change in polarization state, and arrives at the reflector 7 as it is.

The circularly polarized light reflected at the reflector 7 reverts to linearly polarized light with the direction of polarization rotated by 90° after passing through the STN liquid crystal element 22 and the retardation film 12, and the linearly polarized light is all absorbed by the polarizing film 11, so that perfect black display can be obtained.

When a predetermined voltage is applied between the first electrodes 3 and the second electrodes 4 of the STN liquid crystal element 22, the nematic liquid crystal 6 are caused to rise, and a effective Δnd value of the STN liquid crystal element 22 decreases. When birefringent tendency occurring to the STN liquid crystal element 22 by applying the voltage is set equivalent to a quarter wavelength, the linearly polarized light falling on the liquid crystal device through the polarizing film 11 is turned into elliptically polarized light or linearly polarized light after transmitted through the retardation film 12, and the nematic liquid crystal 6, but returns to the polarizing film 11 without being rotated after reflected by the reflector 7, so that nearly all light components are transmitted through the polarizing film 11, and sent out to the visible side, thereby enabling bright white display to be effected.

By combining a display pixel in the on (white) state with a display pixel in the off (black) state, color display can be effected. For example, red display can be effected by turning a pixel provided with a red filter R "on" (white) and turning pixels provided with a green filter G and a blue filter B, respectively, "off" (black).

With the reflection-type liquid crystal display device according to this embodiment, high reflectance and a contrast ratio as high as 10 or more were obtained, so that bright color display having high chroma was effected.

Thus, even with the reflection-type liquid crystal display device of single polarizing film type, it is possible to effect bright color display having high chroma and in high contrast by use of the polarizing film 11, the retardation film 12, the diffusion film 15, and the STN liquid crystal element 22 incorporating the reflector 7 and the color filters 10, installed in this order from the visible side.

Variations of the Third Embodiment

With this embodiment, an angle formed by the absorption axis 11a of the polarizing film 11 and the phase delay axis 12a of the retardation film 12 is defined as an intersection angle α. Even if the polarizing film 11 is rotated by 90°, similar display characteristics can be obtained although there will be a little change in a viewing angle characteristic. Accordingly, if an angle formed by a transmission axis of the polarizing film 11 and the phase delay axis 12a of the retardation film 12 is defined as an intersection angle β, excellent display characteristics can be obtained with the intersection angle β even in a range of 30° to 45°.

With this embodiment, for the STN liquid crystal element 22, the 240° twisted STN liquid crystal element is used, however, even with the use of STN liquid crystal element having a twist angle in a range of 200° to 260°, a similar reflection-type liquid crystal color display device can be obtained by adjusting a placement angle of the polarizing film 11 and the retardation film 12 relative to the STN liquid crystal element 22 while keeping the intersection angles formed by the polarizing film 11 and the retardation film 12 as above.

With this embodiment, the reflector 7 is formed on the underside of the first electrodes 3 such that the protective film 8 is sandwiched therebetween, however, as with the case of the second embodiment, the first electrodes 3 may be composed of a metal film made of aluminum, silver, and so forth to be reflective electrodes doubling as the reflector 7. And the color filters 10 may be formed directly on the reflective electrodes.

Further, with this embodiment, the color filters 10 are installed on the side of the first substrate 1, but the color filters 10 may be formed between the second electrodes 4 provided on the inner face of the second substrate 2, and the second substrate 2 instead.

However, the color filters 10 are preferably installed on the side of the first substrate 1 because this will enable the protective film 8 to serve for planarization of the color filters 10, and to double as an insulation film between the reflector 7 and the first electrodes 3.

Also, for the color filters 10, the filters in three colors of red, green, and blue, are used, however, with the use of color filters in three colors of cyan, yellow, and magenta, similar bright color display can be effected as well.

Fourth Embodiment: FIGS. 14 to 17

A fourth embodiment of a liquid crystal display device according to the invention is described hereinafter with reference to FIGS. 14 to 17. With respective embodiments described hereinafter, a transflective liquid crystal display device of single polarizing film type is implemented according to the invention.

First, the constitution of the liquid crystal display device according to the fourth embodiment is described hereinafter with reference to FIGS. 14 and 15. In these figures, parts corresponding to those previously described in FIGS. 1 and 2 are denoted by the like reference numerals, and description thereof is simplified or omitted.

Figure 14:
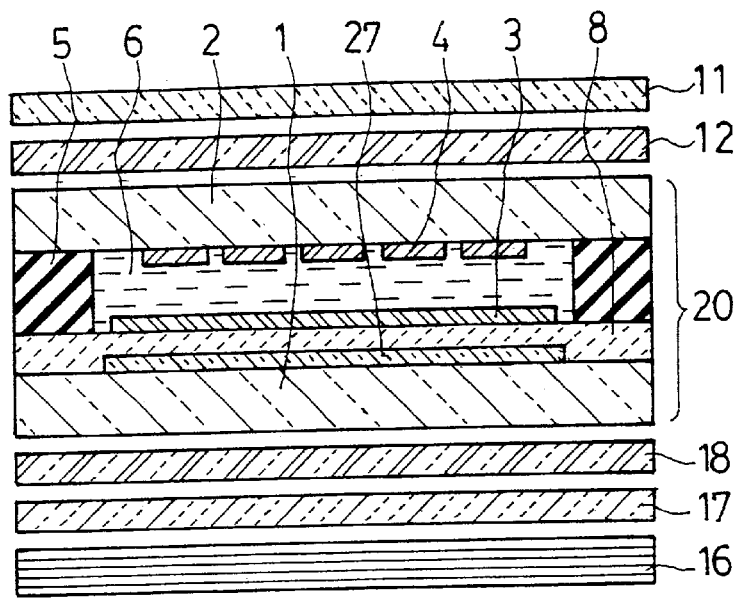
FIG. 14 is a schematic sectional view showing the constitution of a fourth embodiment of a liquid crystal display device according to the invention.

As shown in FIG. 14, the liquid crystal display device comprises an STN liquid crystal element 20', a first retardation film 12 disposed on the outer side (the visible side) of a second substrate 2 of the STN liquid crystal element 20', and a first polarizing film 11 disposed on the outer side of the first retardation film 12, together with a second retardation film 18, a second polarizing film 17, and a backlight 16 that are disposed in sequence on the outer side (the side opposite from the visible side) of a first substrate 1 of the STN liquid crystal element 20'.

The STN liquid crystal element 20' is substantially the same in constitution as the STN liquid crystal element 20 according to the first embodiment shown in FIG. 1 except that, in place of the reflector 7 of the STN liquid crystal element 20 in FIG. 1, a transflective reflector 27 is installed on the inner face of the first substrate 1. The transflective reflector 27 is composed of an aluminum film 0.02 μm thick.

As the aluminum film is rendered very thin in thickness, the transflective reflector 27 allows a portion of incident light to pass therethrough, but reflects the rest, thus serving as a so-called half-mirror.

Figure 15:
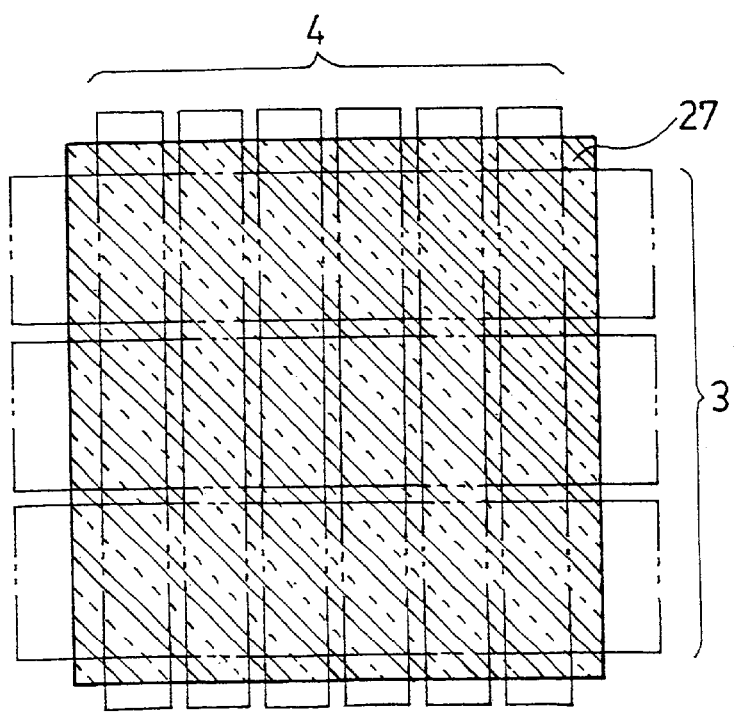
FIG. 15 is a plan view showing a planar configuration among a transflective reflector, first electrodes, and second electrodes of the liquid crystal display device shown in FIG. 14.

With this embodiment, since the thickness of the aluminum film is set at 0.02 μm, about 10 to 20% of the incident light is transmitted therethrough while remaining 80 to 90% of the incident light is reflected, and the transflective reflector 27 is formed in a square shape so as to be common to an entire display region including all of respective pixels where first electrodes 3 and second electrodes 4, shown by phantom lines in FIG. 15, cross and overlap each other, respectively.

The first retardation film 12 and the first polarizing film 11 are the same as the retardation film 12 and the polarizing film 11 used in the first embodiment shown in FIG. 1, but are referred to as the first retardation film 12 and the first polarizing film 11, respectively, hereinafter from this embodiment in order to distinguish these film from the second retardation film 18 and the second polarizing film 17, respectively. The first retardation film 12, and the first polarizing film 11 are integrally joined with each other with an acrylic resin based adhesive, and are bonded to the STN liquid crystal element 20' as well with an acrylic resin based adhesive.

The second retardation film 18 is a film about 70 μm in thickness, formed by drawing polycarbonate, and has a retardation value F3 of 0.14 μm at a wavelength of 0.55 μm, serving as a quarter-wavelength film.

As it is important that the second polarizing film 17 has a high degree of polarization, a polarizing film having a transmittance of 44% and a degree of polarization of 99.99% is adopted for the second polarizing film 17.

For the backlight 16, a light guide plate provided with a fluorescent light or an LED, or an electroluminesecnt (EL) film may be used, however, with this embodiment, an EL film about 1 mm thick emitting white light is used for the backlight 16.

A planar configuration among respective constituent members of the liquid crystal display device is described with reference to FIGS. 16 and 17.

Figure 16:
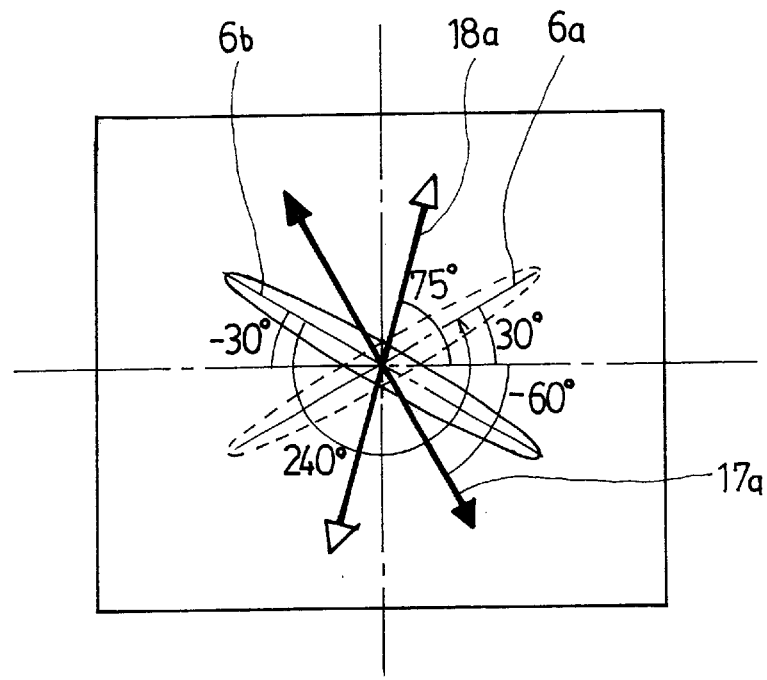
FIG. 16 is a schematic illustration showing a relationship among the direction of an absorption axis of a second polarizing film, the direction of a phase delay axis of a third retardation film, and a twist angle of nematic liquid crystal of an STN liquid crystal element of the liquid crystal display device described above.

On the surface of the first electrodes 3 and the second electrodes 4 of the STN liquid crystal element 20' shown in FIG. 14, an alignment film (not shown) is formed, and as shown in FIG. 16, a lower molecular alignment direction 6a the nematic liquid crystal 6 points at +30° by applying a rubbing treatment to the side of the first substrate 1 in the direction extending upward to the right at 30° relative to the horizontal axis while an upper molecular alignment direction 6b of the nematic liquid crystal 6 points at −30° by applying a rubbing treatment to the side of the second substrate 2 in the direction extending downward to the right at 30° relative to the horizontal axis.

The STN liquid crystal element 20', having a twist angle of 240° counterclockwise, is made up by adding an optical rotatory substance called chiral to the nematic liquid crystal 6 having a viscosity at 20 cp, and adjusting a twist pitch P to 11 μm.

A birefringence difference Δn of the nematic liquid crystal 6 to be used is set at 0.131, and clearance between the first substrate 1 and the second substrate 2, that is, a cell gap d is set at 5.8 μm. Accordingly, a Δnd value Rs indicating a birefringent tendency of the liquid crystal element 20' as expressed by the product of the birefringence difference Δn of the nematic liquid crystal 6 and the cell gap d becomes 0.76 μm.

Figure 17:
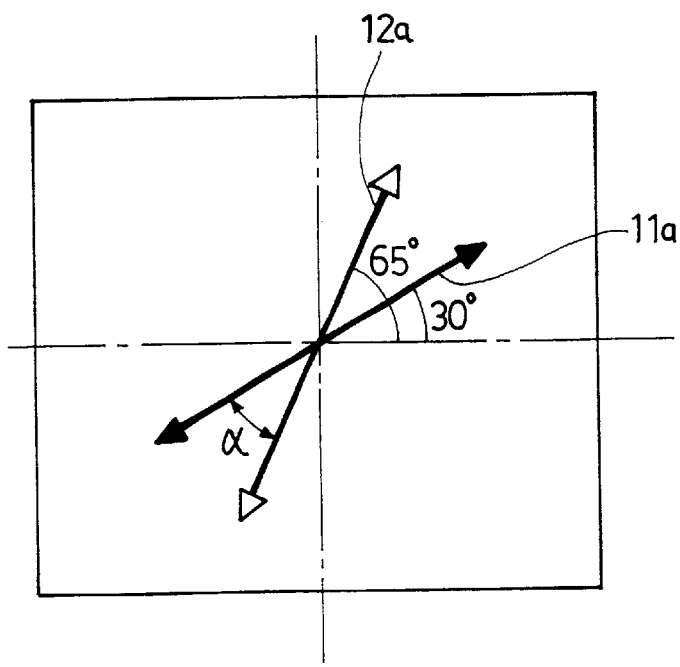
FIG. 17 is a schematic illustration showing a relationship between the direction of an absorption axis of a first polarizing film and the direction of a phase delay axis of a first retardation film.

As shown in FIG. 17, the first polarizing film 11 is disposed such that an absorption axis 11a thereof is at +30° on the basis of the horizontal axis. The first retardation film 12 is disposed such that a phase delay axis 12a thereof is at +65° on the basis of the horizontal axis. Consequently, an intersection angle α formed by the absorption axis 11a of the first polarizing film 11 and the phase delay axis 12a of the retardation film 12 becomes 35°.

As shown in FIG. 16, the second retardation film 18 is disposed on the underside of the STN liquid crystal element 20' such that a phase delay axis 18a thereof is oriented at +75° on the basis of the horizontal axis, and the second polarizing film 17 is disposed such that an absorption axis 17a thereof is oriented at −60° on the basis of the horizontal axis, thereby crossing the absorption axis 11a of the first polarizing film 11 at right angles.

The effect of the liquid crystal display device according to this embodiment is described hereinafter.

The operation and effect of the liquid crystal display device according to this embodiment at the time of reflective display by external light falling from the upper visible side in FIG. 14 are basically the same as those for the liquid crystal display device according to the first embodiment described with reference to FIGS. 10 to 14, and description thereof is therefore omitted.

Then, transmissive display effected when the backlight 16 shown in FIG. 14 is lit up is described hereinafter.

Light emitted from the backlight 16 is turned into linearly polarized light after passing through the second polarizing film 17. The linearly polarized light falls on the third retardation film 18 at an angle of 45° relative to the phase delay axis 18a thereof, and is turned into circularly polarized light. About 80% of the circularly polarized light is reflected by the transflective reflector 27, but remaining 20% thereof is transmitted therethrough.

In a state where no voltage is applied to the STN liquid crystal element 20', a composite retardation value of the first retardation film 12 and the STN liquid crystal element 20' becomes a quarter-wavelength for nearly all wavelengths.

Accordingly, when these films are disposed in such a way as in this embodiment, a retardation occurring at the second retardation film 18 is subtracted by a composite retardation of the STN liquid crystal element 20' and the first retardation film 12, and the retardation becomes zero, whereupon the circularly polarized light is turned into linearly polarized light with the direction of polarization identical to that by the second polarizing film 17, and the linearly polarized light outgoes from the first retardation film 12, falling on the first polarizing film 11.

Since the absorption axis 11a of the first polarizing film 11 crosses the absorption axis 17a of the second polarizing film 17 at right angles (hence the transmission axes thereof also cross each other at right angles), the linearly polarized light falling on the first polarizing film 11 is not transmitted therethrough, thus effecting black display.

When a predetermined voltage is applied between the first electrodes 3 and the second electrodes 4 inside the STN liquid crystal element 20', the liquid crystal molecules of the nematic liquid crystal 6 are caused to rise, and a effective Δnd value of the STN liquid crystal element 20' decreases.

Consequently, the linearly polarized light entering through the second polarizing film 17 from the backlight 16 is turned into circularly polarized light after passing through the second retardation film 18, but is further turned into elliptically polarized light or linearly polarized light as a result of passing through the fist retardation film 12 and the STN liquid crystal element 20'.

When a retardation occurring in the STN liquid crystal element 20' by applying the voltage thereto is rendered equal to a quarter-wavelength, the linearly polarized light entering through the second polarizing film 17 has the direction of polarization rotated by 90° after further passing through the first retardation film 12, and is thereby transmitted through the first polarizing film 11, so that excellent white display can be effected.

As is evident from the operation and effect of the liquid crystal display device according to this embodiment at the time of reflective display similar to those for the first embodiment, and the operation and effect of the liquid crystal display device at the time of transmissive display as described above, with the liquid crystal display device according to the fourth embodiment, excellent black display and bright white display can be effected by disposing the first polarizing film 11 and the first retardation film 12 on the visible side of the STN liquid crystal element 20', and by setting the Δnd value of the STN liquid crystal element 20' incorporating the transflective reflector 27 in a range of 0.7 to 0.8 μm, the retardation value of the first retardation film 12 in a range of 0.35 to 0.40 μm, the intersection angle α formed by the absorption axis 11a of the first polarizing film 11 and the phase delay axis 12a of the first retardation film 12 in a range of 30° to 45°.

Further, by the agency of the second retardation film 18, the second polarizing film 17, and the backlight 16 that are disposed on the underside (a side opposite from the visible side) of the STN liquid crystal element 20', display in good contrast can be effected by lighting up the backlight 16 in an environment where there is little external light.

Variations of the Fourth Embodiment

With the fourth embodiment as described above, an angle formed by the absorption axis 11a of the first polarizing film 11 and the phase delay axis 12a of the first retardation film 12 is defined as an intersection angle α, however, even if the first polarizing film 11 is rotated by 90°, similar display characteristics can be obtained although there will be a little change in a viewing angle characteristic.

Accordingly, if an angle formed by a transmission axis of the first polarizing film 11 and the phase delay axis 12a of the first retardation film 12 is defined as an intersection angle β, excellent display characteristics can be obtained even with the intersection angle β in a range of 30° to 45°.

With this embodiment, for the STN liquid crystal element 20', the STN liquid crystal element of the 240° twisted STN mode are used, however, even with the use of STN liquid crystal element having a twist angle in a range of 200° to 260°, a similar transflective liquid crystal display device can be obtained by adjusting a placement angle of the first polarizing film 11 and the first retardation film 12 relative to the STN liquid crystal element 20' while keeping the intersection angles formed by the first polarizing film 11 and the first retardation film 12 as above.

Further, with the this embodiment, a film formed by drawing polycarbonate is used for the first retardation film 12, however, use of a temperature-compensation type retardation film having a retardation value thereof varying depending on temperature, formed by drawing a film containing liquid crystal, will improve brightness and contrast of display at high or low temperatures, so that a better transflective liquid crystal display device can be obtained.

With this embodiment, the transflective reflector 27 is composed of a thin aluminum film 0.02 μm thick, however, the same composed of a thin aluminum film with thickness in a range of 0.01 to 0.03 μm may serve as a half-mirror allowing a portion of light rays to pass therethrough.

Further, the transflective reflector 27 having pits and projections at a pitch ranging from several to several tens μm formed on the surface thereof is more preferable because this will cause reflected light to scatter, thereby improving visibility.

For the transflective reflector 27, not only the thin aluminum film but also a thin film made of aluminum alloy or silver may be used, or further, a multilayer film composed of an aluminum film and an inorganic oxide film may be used to improve surface reflectance and to protect the surface reflector.

Furthermore, with this embodiment, the transflective reflector 27 and first electrodes 3 are formed separately, however, the first electrodes composed of a thin metal film made of aluminum, silver, or so forth may serve as reflective electrodes doubling as the transflective reflector 27 reflective electrodes, thereby simplifying the construction of the device.

Also, even if the transflective reflector 27 is disposed on the outer side of the first substrate 1, similar effects can be obtained although shadows occur to display.

Figure 18:
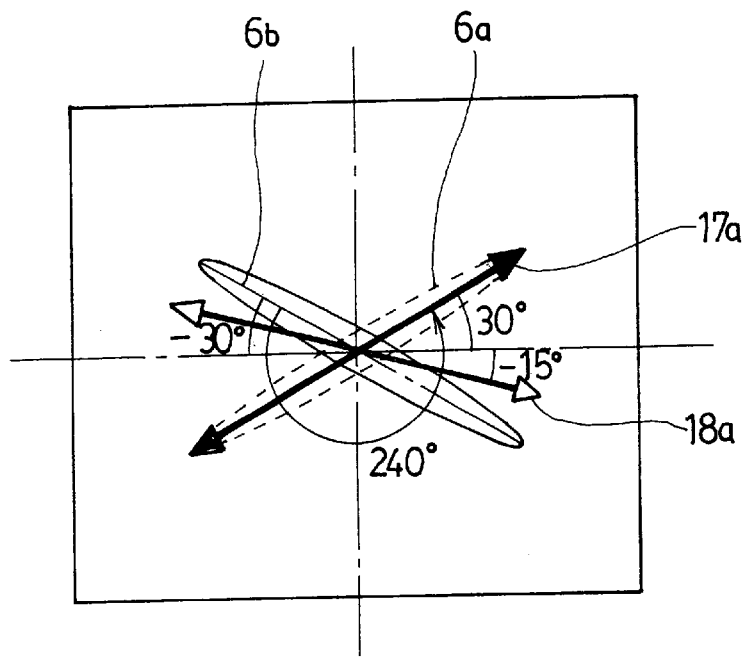
FIG. 18 is a schematic illustration showing a relationship among the direction of an absorption axis of a second polarizing film, the direction of a phase delay axis of a second retardation film, and a twist angle of nematic liquid crystal of an STN liquid crystal element of a liquid crystal display device according to a fifth embodiment of the invention.

Fifth Embodiment: FIG. 18

A fifth embodiment of a liquid crystal display device according to the invention is described hereinafter.

The liquid crystal display device according to the fifth embodiment is substantially the same as the transflective liquid crystal display device according to the fourth embodiment shown in FIGS. 14 and 15, and differs from the fourth embodiment only in respect of a placement angle of a second retardation film 18 and a second polarizing film 17.

Accordingly, only points of difference are described with reference to FIG. 18. In the figures, parts corresponding to those shown in FIGS. 14 and 15 are denoted by the like reference numerals.

The second retardation film 18 is disposed on the underside of an STN liquid crystal element 20' such that the phase delay axis 18a thereof is at −15° on the basis of the horizontal axis, which is different form the fourth embodiment, while the second polarizing film 17 is disposed such that an absorption axis 17a thereof is at +30° on the basis of the horizontal axis so as to be in parallel with an absorption axis 11a of a first polarizing film 11.

Lower and upper molecular alignment directions 6a, 6b of nematic liquid crystal 6 of the STN liquid crystal element 20', respectively, are the same as those for the fourth embodiment, and a twist angle of the STN liquid crystal element 20' is also the same as that for the fourth embodiment, 240° counterclockwise Further, as with the case of the fourth embodiment as described with reference to FIG. 17, an absorption axis 11a of a first polarizing film 11, and a phase delay axis 12a of a first retardation film 12 point at +30° and +65° on the basis of the horizontal axis, respectively, and an intersection angle α formed by the absorption axis 11a and the phase delay axis 12a is 35°.

With the fifth embodiment as well, operation thereof at the time of reflective display is the same as that for the first embodiment, and display in good contrast can be effected by optimizing placement of the first retardation film 12 and the first polarizing film 11.

Transmissive display effected when the backlight 16 is lit up is described hereinafter. Light emitted from the backlight 16 is turned into linearly polarized light after passing through a second polarizing film 17. The linearly polarized light falls on a second retardation film 18 at an angle of 45° relative to a phase delay axis 18a thereof, and is turned into circularly polarized light. About 80% of the circularly polarized light is reflected by a transflective reflector 27, but remaining 20% thereof is transmitted therethrough.

In a state where no voltage is applied to the STN liquid crystal element 20', a composite retardation value of the first retardation film 12 and the STN liquid crystal element 20' rendered equivalent to a quarter-wavelength for nearly all wavelengths.

With this embodiment, the second retardation film 18 is disposed so as to be shifted by 90° from the placement thereof for the first embodiment, and as a result, a retardation occurring to the second retardation film 18 and a composite retardation of the STN liquid crystal element 20' and the first retardation film 12 are added up to become a half-wavelength, whereupon the circularly polarized light is turned into linearly polarized light with the direction of polarization rotated by 90° from that of the linearly polarized light incoming through the second polarizing film 17, and outgoes from the first retardation film 12, then falling on the first polarizing film 11.

Since the absorption axis 11a of the first polarizing film 11 is in parallel with an absorption axis 17a of the second polarizing film 17, the linearly polarized light falling on the first polarizing film 11 is not transmitted therethrough, thus effecting black display.

On the other hand, when a predetermined voltage is applied between the first electrodes 3 and the second electrodes 4 inside the STN liquid crystal element 20', the liquid crystal molecules of the nematic liquid crystal 6 are caused to rise, and a effective Δnd value of the STN liquid crystal element 20' decreases.

Consequently, the linearly polarized light incoming through the second polarizing film 17 is turned into circularly polarized light after passing through the second retardation film 18, but reverts to elliptically polarized light or linearly polarized light as a result of passing through the fist retardation film 12 and the STN liquid crystal element 20'.

When a retardation occurring in the STN liquid crystal element 20' by applying the voltage thereto is rendered equal to a quarter-wavelength, the linearly polarized light incoming through the second polarizing film 17 is transmitted as it is through the STN liquid crystal element 20' and the first retardation film 12 without the direction of polarization rotated, and is thereby transmitted through the first polarizing film 11, so that excellent white display can be effected.

Thus, by the agency of the first polarizing film 11, the first retardation film 12, and the STN liquid crystal element 20' incorporating the transflective reflector 27, that are disposed, excellent black display and bright white display can be effected at the time of reflective display using external light. Further, by the agency of the second retardation film 18, the second polarizing film 17, and the backlight 16 that are disposed on the underside of the STN liquid crystal element 20', display in good contrast can be effected by lighting up the backlight 16 even in an environment where there is little external light.

Figure 19:
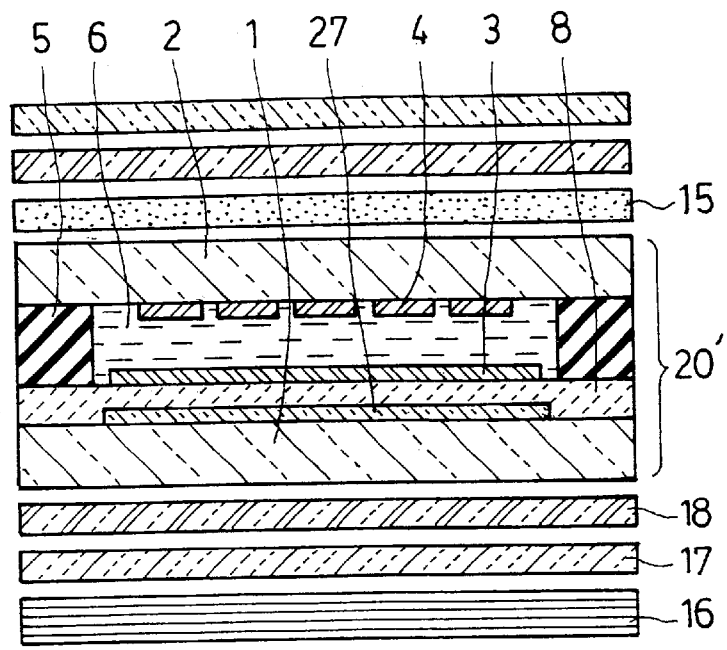
FIG. 19 is a schematic sectional view showing an embodiment implemented by partially altering the constitution of the liquid crystal display device according to the fourth and fifth embodiments of the invention.

Variation of the Fourth and Fifth Embodiments: FIG. 19

FIG. 19 is a schematic sectional view showing the constitution of a liquid crystal display device according to an embodiment wherein a diffusion film is added to the fourth and fifth embodiments, respectively, described in the foregoing. By the agency of a diffusion film 15 installed on the outer side of a second substrate 2 of an STN liquid crystal element 20' as shown in the figure, light reflected by a transflective reflector 27 is caused to scatter, thereby enabling bright display having a wide viewing angle to be effected.

Sixth Embodiment: FIGS. 20 to 23

Now, a sixth embodiment of a liquid crystal display device according to the invention is described hereinafter with reference to FIGS. 20 to 23.

The liquid crystal display device according to the sixth embodiment differs from the liquid crystal display device according to the fourth embodiment only in respect of a twist angle of an STN liquid crystal element, a placement angle of a first retardation film and a second retardation film, the shape of a transflective reflector, and addition of a third retardation film and a diffusion film.

First, the constitution of the liquid crystal display device according to the sixth embodiment is described hereinafter with reference to FIGS. 20 and 21. These figures correspond to FIGS. 13 and 14 for the fourth embodiment, and parts corresponding to those described with reference to FIGS. 13 and 14 are denoted by the same reference numerals, and description thereof are simplified or omitted.

Figure 20:
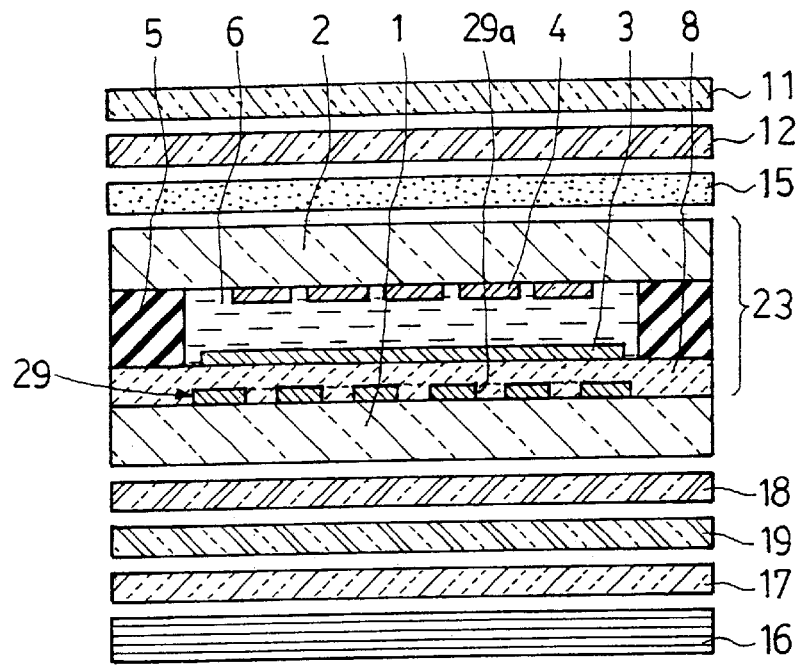
FIG. 20 is a schematic sectional view showing the constitution of a sixth embodiment of a liquid crystal display device according to the invention.

As shown in FIG. 20, the liquid crystal display device comprises an STN liquid crystal element 23, and a diffusion film 15, a first retardation film 12, and a first polarizing film 11 that are disposed in sequence on the outer side (the visible side) of a second substrate 2 of the STN liquid crystal element 23, together with a second retardation film 18, a third retardation film 19, a second polarizing film 17, and a backlight 16 that are disposed in sequence on the outer side (a side opposite from the visible side) of a first substrate 1 of the STN liquid crystal element 23, thereby constituting a transflective liquid crystal display device.

The first polarizing film 11 and the first retardation film are integrally bonded to each other with an acrylic resin based adhesive.

Further, the second retardation film 18, the third retardation film 19, and the second polarizing film 17 are also integrally bonded to each other with an acrylic resin based adhesive, and are bonded to the STN liquid crystal element 23 as well with an acrylic resin based adhesive.

The STN liquid crystal element 23 is comprised of: a first substrate 1 composed of a glass plate 0.5 mm thick, provided with a 0.1 μm thick transflective reflector 29 composed of an aluminum film, a 2 μm thick protective film 8 made of an acrylic material, and 0.3 μm thick first electrodes 3 made of ITO that are formed thereon; a second substrate 2 composed of a glass plate 0.5 mm thick, provided with 0.05 μm thick second electrodes 4 made of ITO, formed on the inner face thereof; a sealant 5 bonding the first substrate 1 with the second substrate 2; and 220° counterclockwise twist aligned nematic liquid crystal 6 sandwiched between the first substrate 1 and the second substrate 2.

Figure 21:
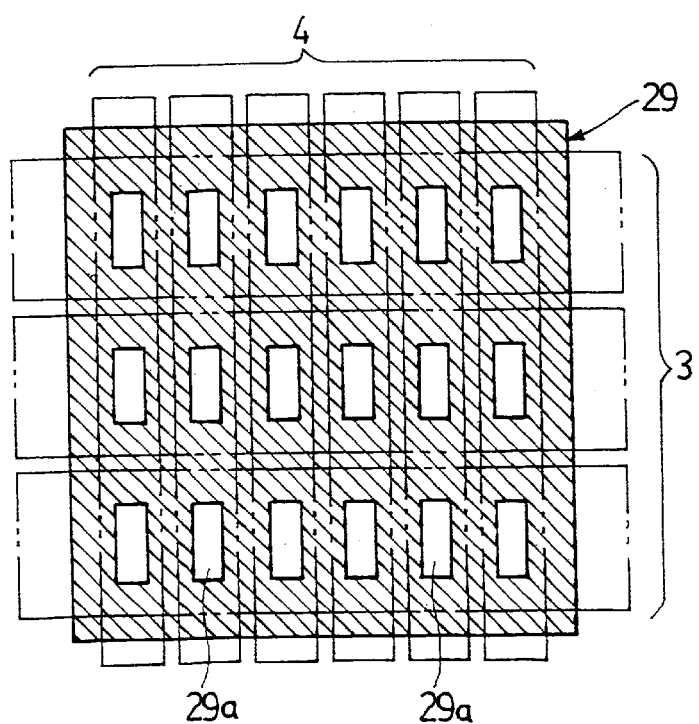
FIG. 21 is a plan view showing a planar configuration among a transflective reflector, first electrodes, and second electrodes, with reference to the liquid crystal display device.

As shown in FIG. 21, the first electrodes 3 and the second electrodes 4 are patterned in stripes running in respective directions orthogonal to each other, and spots where the first electrodes and the second electrodes cross horizontally, and overlap each other, respectively, constitute respective pixels. The transflective reflector 29 is provided so as to be common to an entire display region including all the pixels.

The transflective reflector 29 is provided with an opening 29a formed at every spot corresponding to the respective pixels. The openings 29a are formed by lithography method. As the aluminum film composing the transflective reflector 29 has a thickness thicker than that of the transflective reflector 27 according to the fourth embodiment, all the area of the transflective reflector 29 other than the openings 29a is able to act as a perfect reflector, so that transmittance and reflectance can be adjusted by varying an area of the respective openings 29a. With this embodiment, the area of the respective openings 29a is set to 30% of an area of the respective pixels, thereby allowing about 30% of light rays to be transmitted while reflecting about 70% of the light rays.

The diffusion film 15 shown in FIG. 20 is installed in order to scatter light rays reflected by the transflective reflector 29, so that bright display having a wide viewing angle can be effected.

It is preferable that incident light rays entering from outside undergoes forward scattering as much as possible before transmitted with less back scattering because high contrast can be obtained in this way. In this case, a light scattering type adhesive 30 μm thick, composed of fine particles mixed in an adhesive, is used for the diffusion film 15, and the light scattering type adhesive doubles as an adhesive for bonding the first retardation film 12 with the liquid crystal element 21.

The first polarizing film 11, the second polarizing film 17, and the backlight 16 are the same as those used in the fourth embodiment.

The first retardation film 12 is a transparent film about 70 μm thick, formed by drawing polycarbonate (PC), and has a retardation value F1=0.35 μm at a wavelength of 0.55 μm.

For the first retardation film 12, an ordinary type retardation film is used, wherein refractive indices thereof have a relationship of nx>ny=nz: where nx is refractive index in the direction of a phase delay axis thereof, ny is refractive index in the direction orthogonal to the phase delay axis, and nz is refractive index in the direction of thickness.

The second retardation film 18 is a transparent film about 70 μm thick, formed by drawing polycarbonate (PC), and has a retardation value of 0.14 μm, equivalent to a quarter-wavelength, at a wavelength of 0.55 μm.

The third retardation film 19 is also a transparent film about 70 μm thick, formed by drawing polycarbonate (PC), and has a retardation value of 0.28 μm, equivalent to a half-wavelength, at a wavelength of 0.55 μm. For the second retardation film 18, and the third retardation film 19, an ordinary type retardation film with refractive indices thereof having a relationship of nx>ny=nz is used.

Figure 22:
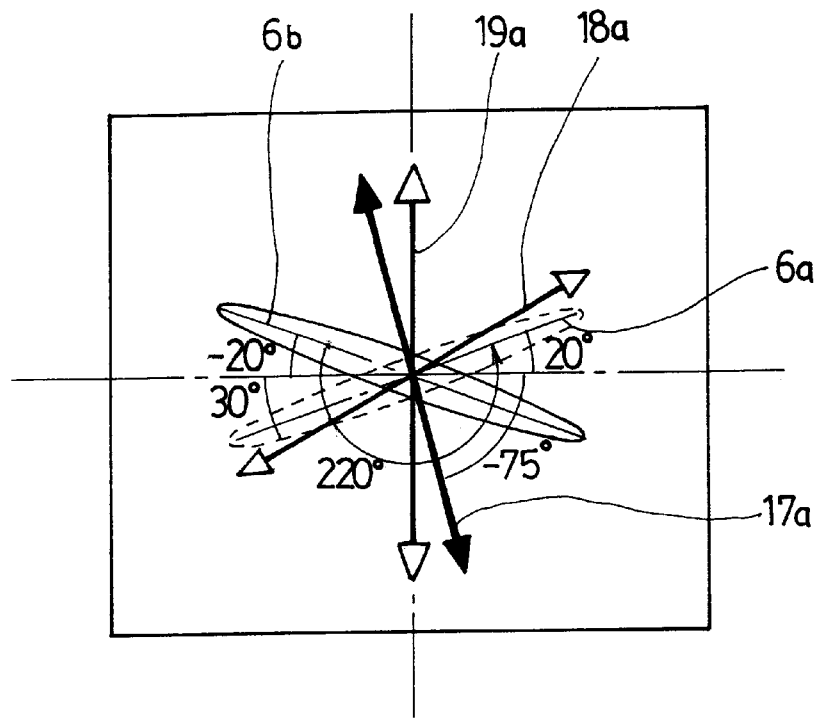
FIG. 22 is a schematic illustration showing a relationship among the direction of an absorption axis of a second polarizing film, the directions of respective phase delay axes of second and third retardation films, and a twist angle of nematic liquid crystal of an STN liquid crystal element the liquid crystal display device.

Next, a configuration among respective constituent members of the liquid crystal display device is described with reference to FIGS. 22 and 23. On the surface of the first electrodes 3 and the second electrodes 4, an alignment film (not shown) is formed, and as shown in FIG. 22, a lower molecular alignment direction 6a of the nematic liquid crystal 6 points at +20° by applying a rubbing treatment to the side of the first substrate 1 in the direction extending upward to the right at 20° relative to the horizontal axis while an upper molecular alignment direction 6b of the nematic liquid crystal 6 points at −20° by applying a rubbing treatment to the side of the second substrate 2 in the direction extending downward to the right at 20° relative to the horizontal axis.

The STN liquid crystal element 23 having a twist angle of 220° counterclockwise is made up by adding an optical rotatory substance called chiral to the nematic liquid crystal having a viscosity at 20 cp and adjusting a twist pitch P to 11 μm.

A birefringence difference Δn of the nematic liquid crystal 6 to be used is set at 0.131, and clearance between the first substrate 1 and the second substrate 2, that is, a cell gap d is set at 5.8 μm. Accordingly, a Δnd value Rs indicating a birefringent tendency of the STN liquid crystal element 23, as expressed by the product of the birefringence difference Δn of the nematic liquid crystal 6 and the cell gap d, becomes 0.76 μm.

Figure 23:
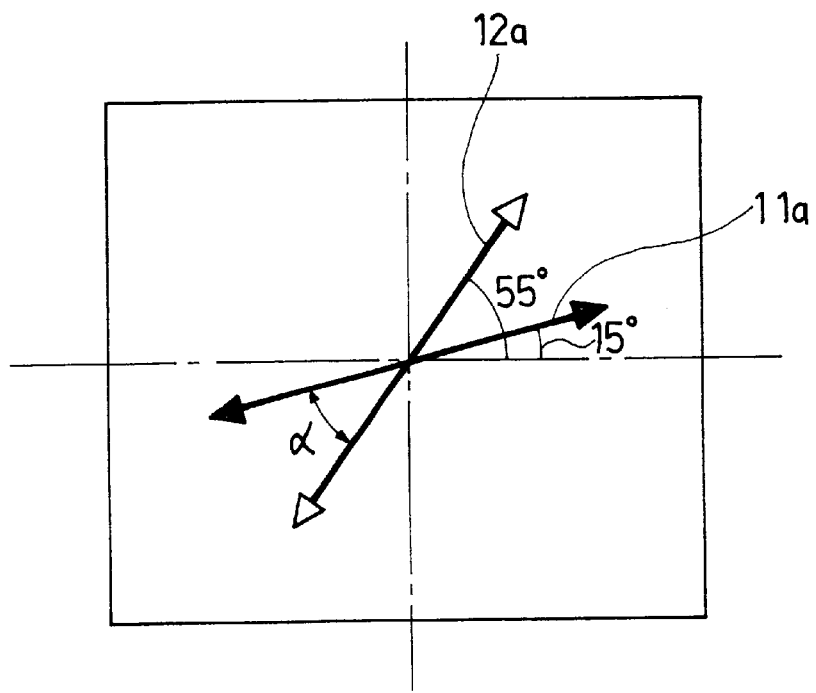
FIG. 23 is a schematic illustration showing a relationship between the direction of an absorption axis of a first polarizing film, and the direction of a phase delay axis of a first retardation film of the liquid crystal display device.

As shown in FIG. 23, the first polarizing film 11 is disposed such that an absorption axis 11a thereof is at +150 on the basis of the horizontal axis. The first retardation film 12 is disposed such that the phase delay axis 12a thereof points at +55° on the basis of the horizontal axis, so that an intersection angle α formed by the absorption axis 11a of the first polarizing film 11 and the phase delay axis 12a of the first retardation film 12 becomes 40°.

As shown in FIG. 22, the second retardation film 18 is disposed on the underside (the side opposite from the visible side) of the STN liquid crystal element 23 such that a phase delay axis 18a thereof points at +30° relative to the horizontal axis, and the third retardation film 19 is disposed such that a phase delay axis 19a thereof is oriented in the vertical direction. And the second polarizing film 17 is disposed such that an absorption axis 17a thereof points at −75° relative to the horizontal axis, thereby crossing the absorption axis 11a of the first polarizing film 11 at right angles.

The operation and effect of the liquid crystal display device according to the sixth embodiment is described hereinafter.

First, the effect thereof at the time of reflective display is described. As for a placement angle of the first polarizing film 11 and the first retardation film 12, the first retardation film 12 has the placement angle such that the phase delay axis 12a thereof is set at +55° on the basis of the horizontal axis since the twist angle 220° of the STN liquid crystal element 23 according to this embodiment differs from 240° for the fourth embodiment.

However, the effect of the intersection angle α formed by the absorption axis 11a of the first polarizing film 11 and the phase delay axis 12a of the first retardation film 12 shows substantially the same tendency as that for the first embodiment. More specifically, the highest contrast can be obtained with the intersection angle α in a range of 38° to 43°, but excellent contrast can not be obtained with the intersection angle α at 30° or less or at 45° or more.

Next, the effect of the Δnd value of the STN liquid crystal element 23 shows substantially the same tendency as that for the fourth embodiment, and the greater the Δnd value of the STN liquid crystal element 23, the higher contrast of display becomes.

However, in the "off" state when no voltage is applied, the reflectance of black display becomes the lowest when the Δnd value is at around 0.75 μm. Accordingly, good contrast is obtained when the Δnd value of the STN liquid crystal element 23 is in a range of 0.70 to 0.80 μm, and particularly, the Δnd value in a range of 0.75 to 0.77 μm is preferable.

Next, the effect of the retardation value F1 of the first retardation film 12 is described hereinafter. The twist angle 220° of the STN liquid crystal element 23 according to this embodiment is smaller than the twist angle 240° for the first embodiment.

Accordingly, the retardation value F1 of the first retardation film 12 is preferably slightly smaller than that for the first embodiment, and high contrast can be obtained with the retardation value falling in a range of 0.35 to 0.36 μm, however, contrast deteriorates with the retardation value at 0.34 μm or less, or at 0.40 μm or more, so that excellent display can not be effected.

With the liquid crystal display device according to this embodiment provided with the 220° twisted STN liquid crystal element 23, perfect black display can be effected in the "off" state by closely optimizing the intersection angle α formed by the first polarizing film 11 and the first retardation film 12, the retardation value F1 of the first retardation film 12, and the Δnd value of the STN liquid crystal element 23.

Components of linearly polarized light incoming through the first polarizing film 11 from the upper visible side in FIG. 20 are turned into circularly polarized light at all wavelengths in the visible light region upon passing through the first retardation film 12 and the nematic liquid crystal 6 of the STN liquid crystal element 23.

Since the diffusion film 15 is made of material having hardly any retardation value and no inclination to cause any change in polarization state, the effect thereof on polarization state is negligible.

The circularly polarized light reflected at the transflective reflector 29 reverts to linearly polarized light with the direction of polarization rotated by 90° upon passing through the nematic liquid crystal 6 and the first retardation film 12 again, and the linearly polarized light is all absorbed by the first polarizing film 11, so that excellent black display can be obtained.

Further, the diffusion film 15 may be disposed anywhere between the second substrate 2 and the first polarizing film 11 or on the outer surface of the first polarizing film 11, however, the same is preferably disposed as close to the second substrate 2 as possible in order to reduce display blurring.

Further, as the thickness of the second substrate 2 is preferably as thin as possible so as to reduce display blurring, the thickness thereof is set at 0.5 mm for this embodiment.

When a predetermined voltage is applied between the first electrodes 3 and the second electrodes 4 of the STN liquid crystal element 23, the nematic liquid crystal molecules 6 are caused to rise, and a effective Δnd value of the STN liquid crystal element 23 decreases.

As a result, the linearly polarized light incoming through the first polarizing film 11 is not turned into perfect circularly polarized light upon passing through the first retardation film 12 and the nematic liquid crystal 6, but reverts to elliptically polarized light or linearly polarized light.

If a birefringent tendency occurring in the nematic liquid crystal 6 by applying the voltage is set to a value equivalent to a quarter-wavelength, the linearly polarized light incoming through the first polarizing film 11 returns as it is without direction of polarization being rotated, and is transmitted through the first polarizing film 11, so that bright white display can be effected.

Transmissive display effected when the backlight 16 is lit up is described hereinafter.

Since the second retardation film 18 and the third retardation film 19 are disposed as shown in FIG. 22, an effective phase delay axis is oriented at 60° on the basis of the horizontal axis, making up a so-called wide-band quarter-wave film, wherein the quotient F/λ, a retardation value F divided by a wavelength λ, is one quarter over all wavelengths.

Light emitted from the backlight 16 is turned into linearly polarized light upon passing through the second polarizing film 17. The linearly polarized light falls on the third retardation film 19 at an angle of 45° relative to an effective phase delay axis composed of phase delay axes of two retardation films, that is, the second retardation film 18 and the third retardation film 19, and is turned into circularly polarized light. Thereafter, about 70% of the circularly polarized light is reflected by the transflective reflector 29, but remaining 30% thereof is transmitted therethrough.

In a state where no voltage is applied to the STN liquid crystal element 23, a composite retardation of the first retardation film 12 and the STN liquid crystal element 23 is equivalent to a quarter-wavelength, and consequently, with such configuration of the constituent members as in this embodiment, retardation occurring to the second retardation film 18 and the third retardation film 19 is subtracted by the composite retardation of the first retardation film 12 and the STN liquid crystal element 23, the difference becoming nearly zero. As a result, the circularly polarized light is turned into linearly polarized light with the direction of polarization identical to that of the linearly polarized light incoming through the second polarizing film 17, outgoing from the first retardation film 12 to fall on the first polarizing film 11.

As the absorption axis 11a of the first polarizing film 11 crosses the absorption axis 17a of the second polarizing film 17 at right angles, the linearly polarized light falling on the first polarizing film 11 is not transmitted therethrough, thereby effecting black display.

By use of the second retardation film 18 and the third retardation film 19, retardation is rendered zero for light in a wavelength band wider than that for the first embodiment using the second retardation film 18 only, so that better black display can be effected.

When a predetermined voltage is applied between the first electrodes 3 and the second electrodes 4 inside the STN liquid crystal element 23, the liquid crystal molecules of the nematic liquid crystal 6 are caused to rise, and a effective Δnd value of the STN liquid crystal element 23 decreases.

Consequently, the linearly polarized light incoming through the second polarizing film 17 is turned into circularly polarized light upon passing through the second retardation film 18 and the third retardation film 19, but reverts to elliptically polarized light or linearly polarized light as a result of passing through the first retardation film 12 and the STN liquid crystal element 23.

When a retardation occurring in the STN liquid crystal element 23 by applying the voltage thereto is set to equivalent to a quarter-wavelength, the linearly polarized light incoming through the second polarizing film 17 has the direction of polarization rotated by 90°, and thereby is transmitted through the first polarizing film 11, enabling excellent white display to be effected.

Thus, with the liquid crystal display device comprised of the first polarizing film 11, the first retardation film 12, and the STN liquid crystal element 23 incorporating the transflective reflector 27, excellent black display and bright white display can be effected at the time of reflective display using external light by setting the Δnd value of the STN liquid crystal element 23 in a range of 0.7 to 0.8 μm, the retardation value F1 of the first retardation film 12 in a range of 0.35 to 0.40 μm, and the intersection angle α formed by the absorption axis 11a of the first polarizing film 11 and the phase delay axis 12a of the first retardation film 12 in a range of 30° to 45°. Further, by the agency of the second retardation film 18, the third retardation film 19, the second polarizing film 17, and the backlight 16 that are disposed on the underside of the STN liquid crystal element 23, display in good contrast can be effected by lighting up the backlight 16 even in an environment where there is little external light.

Furthermore, with adoption of the transflective reflector 29 provided with the opening 29a corresponding to the respective pixels, reflectance can be rendered adaptable to a liquid crystal display device with emphasis on transmissive display by enlarging the respective openings 29a, and adaptable to a liquid crystal display device with emphasis on reflective display by reducing the respective openings 29a.

Variations of the Sixth Embodiment

With the sixth embodiment as described above, an angle formed by the absorption axis 11a of the first polarizing film 11 and the phase delay axis 12a of the first retardation film 12 is defined as an intersection angle α, however, even if the first polarizing film 11 is rotated by 90°, similar display characteristics can be obtained although there will be a little change in a viewing angle characteristic.

Accordingly, if an angle formed by a transmission axis of the first polarizing film 11 and the phase delay axis 12a of the first retardation film 12 is defined as an intersection angle β, excellent display characteristics can be obtained even with the intersection angle β in a range of 30° to 45°.

With this embodiment, for the STN liquid crystal element 23, the 220° twisted STN liquid crystal element is used, however, even with the use of STN liquid crystal element having a twist angle in a range of 200° to 260°, a similar transflective liquid crystal display device can be obtained by adjusting a placement angle of the first polarizing film 11 and the first retardation film 12 while keeping the intersection angles formed by the first polarizing film 11 and the first retardation film 12 as above.

Further, for the first retardation film 12, use is made of a retardation film formed by uniaxial drawing of polycarbonate (PC) such that a relationship among refractive index nz in the direction of z axis, refractive index nx in the direction of drawing, and refractive index ny in the direction orthogonal to the direction of drawing is expressed by the following formula:

$$nx>ny=nz$$

However, the same effect can be obtained even with the use of a so-called Z type retardation film formed by multi-axial drawing of polycarbonate (PC) such that the relationship described above can be expressed by the formula, nx>nz>ny, or a retardation film formed by drawing material such as polyvinylalcohol (PVA), polypropylene (PP), and so forth.

Further, with this embodiment, a configuration is made such that the composite retardation of the first retardation film 12 and the STN liquid crystal element 23 is subtracted by the retardation occurring at the second retardation film 18 and the third-retardation film 19, however, as with the fifth embodiment, the configuration can be arranged such that the composite retardation of the first retardation film 12 and the STN liquid crystal element 23 is added to the retardation occurring at the second retardation film 18 and the third retardation film 19 the sum becoming a half-wavelength.

Furthermore, with this embodiment, the second retardation film 18 is disposed such that the phase delay axis 18a thereof is oriented at +30° on the basis of the horizontal axis, and the third retardation film 19 is disposed such that the phase delay axis 19a thereof is oriented at 90° on the basis of the horizontal axis, however, even if the configuration is made such that the phase delay axis 18a of the second retardation film 18 is oriented at 90° while the phase delay axis 19a of the third retardation film 19 is oriented at +30°, the same effect can be obtained as far as an intersection angle formed by the respective phase delay axes is 60°.

Further, with this embodiment, the two retardation films, that is, the second retardation film 18 and the third retardation film 19, are disposed on the underside of the STN liquid crystal element 23, however, as with the cases of the fourth and fifth embodiments, even only by installation of the second retardation film 18 having a retardation value equivalent to a quarter-wavelength, similar advantageous effects can be obtained although contrast deteriorates to some extent at the time of transmissive display.

Figure 24:
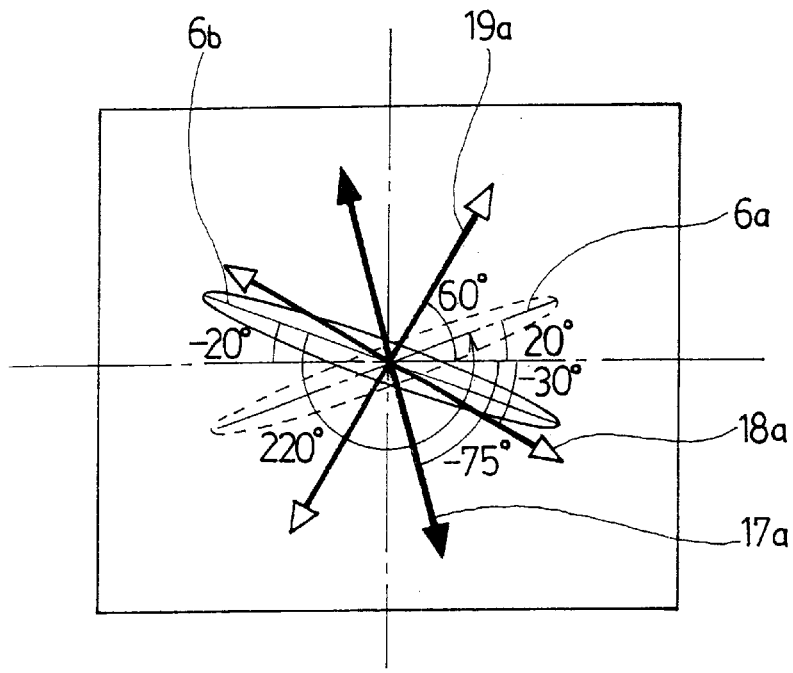
FIG. 24 is a schematic illustration showing a relationship among the direction of a transmission axis of a second polarizing film, the directions of respective phase delay axes of second and third retardation films, and a twist angle of nematic liquid crystal of an STN liquid crystal element of a liquid crystal display device according to a seventh embodiment of the invention.
Figure 27:
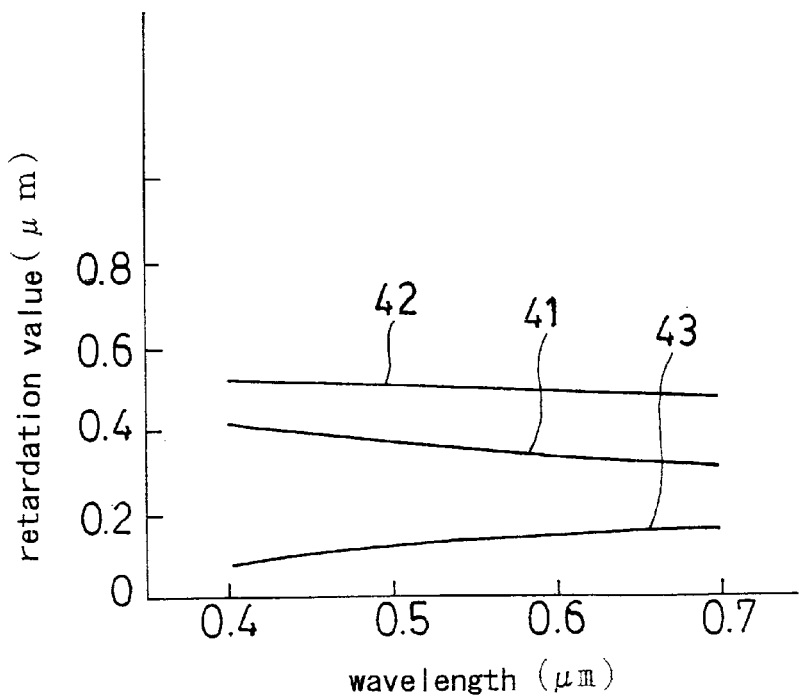
FIG. 27 is a diagram showing wavelength dependency of retardation values of the second retardation film and the third retardation film of the liquid crystal display device.

Seventh Embodiment: FIGS. 24 and 27

Next, a seventh embodiment of a liquid crystal display device according to the invention is described hereinafter with reference to FIGS. 24 and 27.

The liquid crystal display device according to the seventh embodiment differs from the liquid crystal display device according to the sixth embodiment only in respect of the type and placement angle of a second retardation film 18 and a third retardation film 19, and the constitution thereof is the same as that shown in FIGS. 20 and 21. Accordingly, detailed description thereof is omitted.

FIG. 24 is a schematic illustration showing a configuration of constituent elements of the seventh embodiment of the invention.

Placement of an STN liquid crystal element 23, a first retardation film 12, a first polarizing film 11, and a second polarizing film 17 is the same as that for the sixth embodiment shown in FIG. 20.

The second retardation film 18 is a transparent film about 70 μm thick, formed by drawing polycarbonate (PC), and has a retardation value F2=0.36 μm at a wavelength of 0.55 μm. The third retardation film 19 is a transparent film about 100 μm thick, formed by drawing polypropylene (PP), and has a retardation value F3=0.50 μm at a wavelength of 0.55 μm.

The second retardation film 18 disposed on the underside of the STN liquid crystal element 23 is disposed such that a phase delay axis 18a thereof is oriented at −30° on the basis of the horizontal axis unlike the case of the sixth embodiment while the third retardation film 19 is disposed such that a phase delay axis 19a thereof is oriented at +60°. Accordingly, the retardation value F3 of the third retardation film 19 is subtracted by the retardation value F2 of the second retardation film 18, and thereby an effective retardation value becomes: ΔF=F3−F2=0.14 μm FIG. 27 shows wavelength-dependency of retardation values of the second retardation film and the third retardation film used in this embodiment. The horizontal axis indicates light wavelength, and the vertical axis indicates retardation values of the retardation films. A curve 41 indicates retardation values of the second retardation film 18, a curve 42 indicates retardation values of the third retardation film 19, and a curve 43 indicates retardation values when the second retardation film 18 is superposed on the third retardation film 19 such that respective phase delay axes cross each other at right angles.

The constituent material of the second retardation film 18 is polycarbonate (PC) having large wavelength-dependency of refractive index, and consequently, the retardation values thereof at short wavelengths become greater as indicated by the curve 41.

Meanwhile, the constituent material of the third retardation film 19 is polypropylene (PP) having small wavelength-dependency of refractive index, and consequently, the retardation values thereof undergo hardly any change, so that the retardation values at short wavelengths are substantially the same as those at long wavelengths.

Accordingly, by superposing the second retardation film 18 on the third retardation film 19 such that respective phase delay axes cross each other at right angles, the retardation values for light components at short wavelengths in the neighborhood of 0.4 μm can be rendered smaller than the retardation values for light components at long wavelengths in the neighborhood of 0.7 μm as indicated by the curve 43.

That is, with the use of two sheets of the retardation films each having different wavelength-dependency of refractive index, it becomes possible to form a so-called wide-band quarter-wavelength film wherein retardation values in a short-wavelength region is smaller than retardation values in a long-wavelength region.

As a result, the quotient F/λ, a retardation value F divided by a wavelength λ, can be rendered approximately one quarter across the entire visible light region, so that circularly polarized light can be obtained in all wavelength regions.

Advantageous effects of the liquid crystal display device according to the seventh embodiment is described hereinafter.

The operation of the liquid crystal display device at the time of reflective display is the same as that for the sixth embodiment described above, and by optimizing placement conditions of the first retardation film 12 and the first polarizing film 11, display in good contrast can be effected. Further, by installing a diffusion film 15, bright display having a wide viewing angle can be effected.

Transmissive display effected when a backlight 16 is lit up is described hereinafter. Light emitted from the backlight 16 is turned into linearly polarized light upon passing through the second polarizing film 17. The linearly polarized light falls on the third retardation film 19 at an angle of 45° relative to an effective phase delay axis of the wide-band quarter-wavelength film formed by the second retardation film 18 and the third retardation film 19, and consequently, the linearly polarized light is turned into circularly polarized light.

Thereafter, about 70% of the circularly polarized light is reflected by a transflective reflector 29, but remaining 30% thereof is transmitted therethrough.

In a state where no voltage is applied to the STN liquid crystal element 23, a composite retardation of the first retardation film 12 and the STN liquid crystal element 23 is also a quarter-wavelength, and consequently, with such a configuration of the constituent members as in this embodiment, a retardation value occurring at the second retardation film 18 and the third retardation film 19 is subtracted by a composite retardation of the first retardation film 12 and the STN liquid crystal element 23, the difference becoming zero, so that the linearly polarized light incoming through the second polarizing film 17 outgoes from the first retardation film 12 with the direction of polarization unrotated, and falls on the first polarizing film 11.

Since an absorption axis 11a of the first polarizing film 11 and an absorption axis 17a of the second polarizing film 17 cross each other at right angles, incident light from the backlight 16 is not transmitted through the first polarizing film 11, thereby effecting black display.

On the other hand, when a predetermined voltage is applied between first electrodes 3 and second electrodes 4 inside the STN liquid crystal element 23, the operation of the liquid crystal display device is the same as that for the sixth embodiment, so that white display is effected Thus, with the liquid crystal display device comprised of the first polarizing film 11, the first retardation film 12, the diffusion film 15, and the STN liquid crystal element 23 incorporating the transflective reflector 29, excellent black display and bright white display can be effected at the time of reflective display using external light by setting the Δnd value of the STN liquid crystal element 23 in a range of 0.7 to 0.8 μm, the retardation value F1 of the first retardation film 12 in a range of 0.35 to 0.40 μm , and the intersection angle α formed by the absorption axis 11a of the first polarizing film 11 and the phase delay axis 12a of the first retardation film 12 in a range of 30° to 45°.

Further, by the agency of the second retardation film 18, the third retardation film 19, the second polarizing film 17, and the backlight 16 that are disposed on the underside (a side opposite from the visible side) of the STN liquid crystal element 23, display in good contrast can be effected by lighting up the backlight 16 even in an environment where there is little external light.

Figure 25:
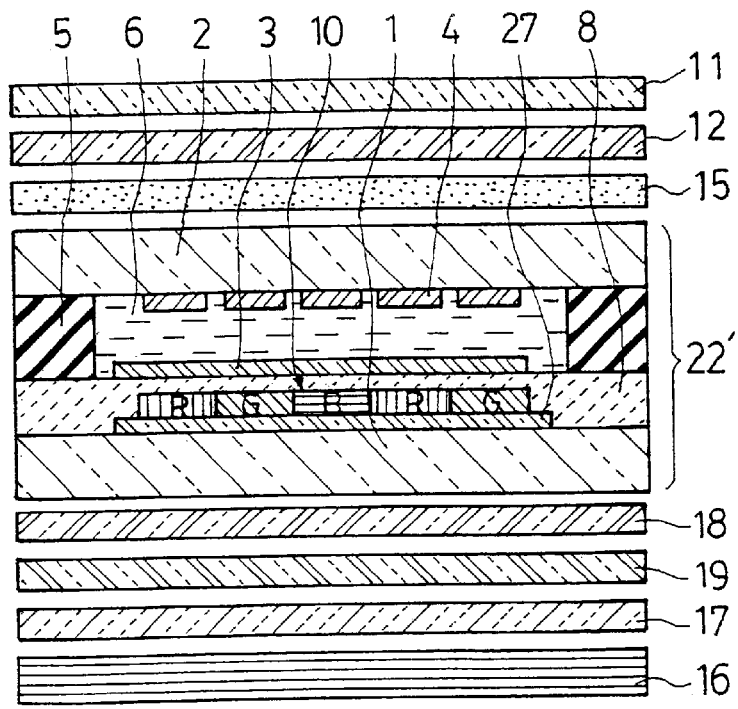
FIG. 25 is a schematic sectional view showing the constitution of an eighth embodiment of a liquid crystal display device according to the invention.
Figure 26:
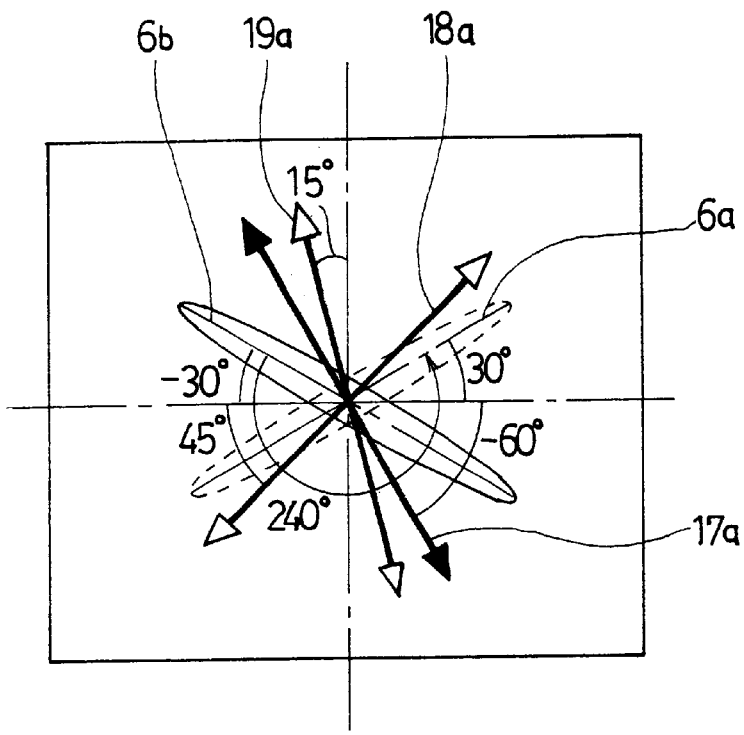
FIG. 26 is a schematic illustration showing a relationship among the direction of an absorption axis of a second polarizing film, the direction of a phase delay axis of a second retardation film, and a twist angle of nematic liquid crystal of an STN liquid crystal element of the liquid crystal display device.

Eighth Embodiment: FIGS. 25 and 26

Next, an eighth embodiment of a liquid crystal display device according to the invention is described hereinafter with reference to FIGS. 25 and 26.

The liquid crystal display device according to the eighth embodiment differs from the previously-described liquid crystal display device according to the sixth embodiment only in that a twist angle of an STN liquid crystal element is 240°, color filters are installed, and a transflective reflector is of a half-mirror type.

FIG. 25 is a schematic sectional view illustrating constituent elements of the liquid crystal display device according to the eighth embodiment, and FIG. 26 is a schematic illustration showing a planar configuration of the STN liquid crystal element, a second retardation film, a third retardation film, and a second polarizing film.

As shown in FIG. 25, the liquid crystal display device according to this embodiment comprises: an STN liquid crystal element 22'; a diffusion film 15, a first retardation film 12, and a first retardation film 11 that are disposed in sequence on the outer side (the visible side) of a second substrate 2 of the STN liquid crystal element 22'; and a second retardation film 18, a third retardation film 19, a second polarizing film 17, and a backlight 16 that are disposed in sequence on the outer side (a side opposite from the visible side) of a first substrate 1 of the STN liquid crystal element 22', thereby constituting a transflective liquid crystal display device.

The first polarizing film 11 and the first retardation film 12 are integrally bonded to each other with an acrylic resin based adhesive, and are bonded to the STN liquid crystal element 22' by use of the diffusion film 15.

Further, the second retardation film 18, the third retardation film 19, and the second polarizing film 17 are also integrally bonded to each other with an acrylic resin based adhesive, and are bonded to the STN liquid crystal element 22' as well with an acrylic resin based adhesive.

The STN liquid crystal element 22' differs from the liquid crystal element of the third embodiment shown in FIGS. 8 and 9 only in that a transflective reflector 27 is substituted for the reflector 7.

More specifically, the STN liquid crystal element 22' is comprised of the transflective reflector 27 made of aluminum 0.02 $\mu$m thick, the color filters 10 composed of 1 $\mu$m thick filters in three colors consisting of red filters R, green filters G, and blue filters B, a protective film 8 made of an acrylic material 2 $\mu$m thick, and first electrodes 3 made of ITO 0.3 $\mu$m thick, that are formed on the inner face of a first substrate 1 composed of a glass sheet 0.5 mm thick.

The first substrate 1 is bonded to a second substrate 2 composed of a glass sheet 0.5 mm thick provided with second electrodes 4 made of ITO 0.5 $\mu$m thick formed on the inner face thereof, with a sealant 5, and 240° counter clockwise twist-aligned nematic liquid crystal 6 is sandwiched between the first substrate 1 and the second substrate 2.

The transflective reflector 27 is made to serve as a so-called half-mirror allowing a portion of incident light to pass therethrough while reflecting the rest by rendering an aluminum film thereof very thin in thickness With this embodiment, as the thickness of the aluminum film is set at 0.02 $\mu$m as with the fourth embodiment, about 10 to 20% of light is transmitted therethrough while remaining 80 to 90% thereof is reflected, and the transflective reflector 27 is formed over the entire display region.

The first polarizing film 11, the diffusion film 15, the second retardation film 18, the third retardation film 19, and the second polarizing film 17 are the same as those used in the sixth embodiment described in the foregoing.

The first retardation film 12 is the same as that used for the fourth embodiment described in the foregoing, and is a Z type retardation film having a retardation value F1=0.39 $\mu$m at a wavelength of 0.55 $\mu$m.

For the backlight 16, the same electroluminesecnt (EL) film emitting white light as used in the fourth to the seventh embodiments may be used, however, in carrying out this embodiment, a backlight of sidelight type, that is, a three-wavelength type fluorescent tube attached to light guide plate is used from the standpoint of enhancement of chroma and brightness.

The color filters 10 are comprised of filters in three colors consisting of red filters R, green filters G, and blue filters B, and are formed in alternate and parallel stripes so as to correspond to the second electrodes 4 as shown in FIG. 9.

The respective color filters R, G, B are formed to have a width wider than that of the respective second electrodes 4 so as not to have a gap therebetween. It is not desirable that there exists a gap between the respective color filters 10 because this will cause white light to be mixed with display colors, and degrade color purity although a quantity of incident light is increased, and display of images becomes brighter.

For improvement of brightness, the color filters 10 preferably have the maximum transmittance at an optical spectrum, as high as possible, and the respective color filters preferably have the maximum transmittance of 80% or more, most preferably 90% or more. Further, the minimum transmittance thereof, at an optical spectrum, need be as high as 20 to 50%.

For the color filters 10, various types such as a pigment dispersion type, a dyeing type, a printing type, a transfer type, a electrodeposition type and so forth can be used, however, a color filter of the pigment dispersion type made by dispersing a pigment in an acrylic resin based or PVA based photosensitive resin, is most preferable because of heat resistance at high temperatures and high color purity.

For obtaining the color filters 10 having such a high transmittance as described above, the transflective reflector 27 composed of a thin aluminum film is formed on the inner face of the first substrate 1, the surface of the transflective reflector 27 is inactivated by anodizing, subsequently a color resist with 10 to 15% of a pigment blended with photosensitive resin is applied to the inner face of the first substrate 1 by use of a spinner, and an exposure and a development treatment is applied thereto, whereby the 1 $\mu$m thick color filters 10 having a high transmittance is formed.

FIG. 26 shows a planar congifuration of respective constituent members of the liquid crystal display device.

A configuration of the STN liquid crystal element 22', the first retardation film 12, and the first polarizing film 11 is the same as that for the fourth embodiment, and an intersection angle $\alpha$ formed by an absorption axis 11a of the first polarizing film 11 and a phase delay axis 12a of the first retardation film 12 is set at 35°.

The second retardation film 18 is disposed such that a phase delay axis 18a thereof is oriented at +45° on the basis of the horizontal axis, and the third retardation film 19 is disposed such that a phase delay axis 19a thereof is oriented at +105°, thereby forming the wide-band quarter-wavelength film as described in the sixth embodiment, having an effective phase delay axis oriented at +75° on the basis of the horizontal axis.

By disposing the second retardation film 18 and the third retardation film 19 in such a way as in this embodiment, a retardation occurring at the second retardation film 18 and the third retardation film 19 is subtracted by a composite retardation of the first retardation film 12 and the STN liquid crystal element 22', and a resultant retardation becomes zero in all wavelength regions, The effect and operation of the liquid crystal display device according to the eighth embodiment is described hereinafter.

Since the color filters 10 have no birefringent tendency, the operation of the device at the time of reflective display is the same as that for the fourth embodiment, and display in good contrast can be effected by optimizing a configuration of the first retardation film 12 and the first polarizing film 11.

By combining a pixel in the on (white) state with a pixel in the off (black) state, color display can be effected. For example, red display can be effected by turning a pixel provided with a red filter R "on" (white) while turning a pixel provided with a green filter G and a blue filter B, respectively, "off" (black).

With the transflective liquid crystal display device according to this embodiment, a high reflectance and a contrast ratio as high as 10 or more were obtained, so that bright color display having high chroma was effected even at the time of reflective display when the backlight 16 was not lit up.

Next, transmissive display effected when the backlight 16 is lit up is described hereinafter.

Light emitted from the backlight 16 is turned into linearly polarized light upon passing through the second polarizing film 17. The linearly polarized light falls on the third retardation film 19 at an angle of 45° relative to the effective phase delay axis of the wide-band quarter-wavelength film formed by the second retardation film 18 and the third retardation film 19, and is thereby turned into circularly polarized light.

Thereafter, about 80% of the circularly polarized light is reflected by the transflective reflector 27, but remaining 20% thereof is transmitted therethrough.

In a state where no voltage is applied to the STN liquid crystal element 22', the composite retardation value of the first retardation film 12 and the STN liquid crystal element 22' is equivalent to a quarter-wavelength, and with this embodiment, the configuration of constituents members is such that a retardation occurring to the second retardation film 18 and the third retardation film 19 is subtracted by the composite retardation of the first retardation film 12 and the STN liquid crystal element 22', the difference becoming zero. Consequently, the circularly polarized light is turned into linearly polarized light with the direction of polarization rotated so as to be identical to the direction of the absorption axis 17a of the second polarizing film 17, and outgoes from the first retardation film 12 to fall on the first polarizing film 11.

Since the absorption axis 11a of the first polarizing film 11 crosses the absorption axis 17a of the second polarizing film 17 at right angles, the linearly polarized light falling on the first polarizing film 11 is not transmitted therethrough, thereby effecting black display.

When a predetermined voltage is applied between the first electrodes 3 and the second electrodes 4, white display is effected due to the same operation of the device as that for the fourth embodiment.

Thus, by the agency of the first polarizing film 11, the first retardation film 12, the diffusion film 15, and the STN liquid crystal element 22' incorporating the transflective reflector 27, and the color filters 10, color display in excellent contrast can be effected at the time of reflective display using external light. Further, by the agency of the second retardation film 18, the third retardation film 19, the second polarizing film 17, and the backlight 16 that are disposed on the underside of the STN liquid crystal element 22', excellent color display can be effected by lighting up the backlight 16 even in an environment where there is little external light.

Variations of the Eighth Embodiment

With the eighth embodiment, for the STN liquid crystal element 22', the 240° twisted STN liquid crystal element is used, however, even with the use of STN liquid crystal element having a twist angle in a range of 200° to 260°, a similar transflective liquid crystal display device can be obtained by adjusting a placement angle of the first polarizing film 11 and the first retardation film 12 relative to the STN liquid crystal element 22' while keeping the intersection angle formed by the absorption axis or the phase delay axis of the first polarizing film 11 and the first retardation film 12 in a range of 30° to 45°.

With this embodiment, the second retardation film 18, the third retardation film 19, the second polarizing film 17, and the backlight 16 are installed on the underside of the liquid crystal element 22', however, a transflective liquid crystal display device similar to one according to this embodiment can be obtained by installation of the second retardation film 18, the second polarizing film 17, and the backlight 16 only as with the cases of the fourth and fifth embodiments although contrast deteriorates to some extent at the time of transmissive display.

Further, with this embodiment, for the second retardation film 18 and the third retardation film 19, the constituent material having the same wavelength-dependency of refractive index is used, and the retardation films 18, 19 are arranged such that respective phase delay axes thereof cross each other so as to form an intersection angle of 60° therebetween, however, as with the case of the seventh embodiment, two retardation films, each made of a constituent material having different wavelength-dependency of refractive indices, may be used and arranged such that respective phase delay axes thereof cross each other at right angles.

Still further, with this embodiment, the color filters 10 are installed on the side of the first substrate 1, however, the color filters 10 may be formed between the second electrodes 4 and the second substrate 2 on the inner side of the second substrate 2. However, the color filters 10 are preferably installed on the side of the first substrate 1 because the protective film 8 can serve for planarization of the color filters 10, doubling as an insulation film between the transflective reflector 27 and the first electrodes 3.

Furthermore, with this embodiment, for the color filters 10, the filters in three colors consisting of red, green, and blue are used, however, even with the use of color filters in three colors consisting of cyan, yellow, and magenta similar bright color display can be effected.

Also, with this embodiment, in forming the transflective reflector 27, the surface of a thin aluminum film is inactivated by anodizing so as to be able to withstand a cleaning operation in the fabrication process of the color filters, however, a transparent thin film such as a silicon oxide ($SiO_2$) film may be formed on the thin aluminum film instead by the sputtering method or chemical vapor deposition (CVD) method.

Further, with this embodiment, for the transflective reflector 27, a half-mirror type thin aluminum film 0.02 $\mu$m thick is used, however, it is possible to employ a thin metal film provided with an opening corresponding to every pixel as used in the sixth and seventh embodiments.

INDUSTRIAL APPLICABILITY

As is evident from the foregoing description, with the reflection-type liquid crystal display device of single polarizing film type according to the invention, bright reflective display in high contrast can be effected by taking advantage of external light while with the transflective liquid crystal display device according to the invention, similar reflective display and transmissive display in high contrast by lighting up the backlight can be effected.

Accordingly, such liquid crystal display devices are available for widespread application as a display unit for various electronic equipment such as cellular phones, personal digital assistants (PDA), portable PCs, game machines, timepieces, video cameras, and so on.

What is claimed is:

1. A liquid crystal display device comprising:
   an STN liquid crystal element comprised of 200° to 260° twist aligned nematic liquid crystal sandwiched between a first substrate provided with a reflector and a first electrode, and a second substrate provided with a plurality of second electrodes;
   a retardation film disposed on an outer side of the second substrate of the STN liquid crystal element; and
   a polarizing film disposed on an outer side of the retardation film;
   wherein where any one of said plurality of second electrodes overlaps with said first electrode defines a pixel;
   wherein a Δnd value indicating a birefringent tendency of the STN liquid crystal element is in a range from 0.7 µm to 0.8 µm;
   a retardation value R of the retardation film indicating a birefringent tendency thereof is in a range from 0.35 to 0.40 µm, and
   an intersection angle formed by a phase delay axis of the retardation film and an absorption axis or a transmission axis of the polarizing film is a range from 30° to 45°.

2. A liquid crystal display device according to claim 1, wherein the first electrodes are reflective electrodes formed of a reflective material to serve as the reflector.

3. A liquid crystal display device according to claim 1, wherein color filters are installed on the nematic liquid crystal side of the first substrate than the reflector, or on the nematic liquid crystal side of the second substrate.

4. A liquid crystal display device according to claim 3, wherein the color filters are composed of filters in a plurality of colors.

5. A liquid crystal display device according to claim 1, wherein a diffusion film is installed on the outer side of the second substrate.

6. A liquid crystal display device according to claim 1, wherein refractive indices of the retardation film have a relationship as expressed by the formula:

$$nx > nz > ny$$

where nx is refractive index in the direction of the phase delay axis thereof, ny is refractive index in the direction orthogonal to the phase delay axis, and nz is refractive index in the direction of thickness thereof.

7. A liquid crystal display device comprising:
   an STN liquid crystal element comprised of 200° to 260° twist aligned nematic liquid crystal sandwiched between a first substrate thereof, provided with a transflective reflector and first electrodes, and a second substrate thereof, provided with second electrodes;
   a first retardation film disposed on the outer side of the second substrate of the STN liquid crystal element;
   a first polarizing film disposed on the outer side of the first retardation film;
   a second retardation film disposed on the outer side of the first substrate of the STN liquid crystal element;
   a second polarizing film disposed on the outer side of the second retardation film; and
   a backlight disposed on the outer side of the second polarizing film,
   wherein a Δnd value indicating a birefringent tendency of the STN liquid crystal element is in a range of 0.7 µm to 0.8 µm,
   a retardation value R of the first retardation film indicating a birefringent tendency thereof is in a range of 0.35 to 0.40 µm,
   a first intersection angle formed by a phase delay axis of the first retardation film and an absorption axis or a transmission axis of the first polarizing film is a range of 30° to 45°, and
   a second intersection angle formed by a phase delay axis of the second retardation film and an absorption axis or a transmission axis of the second polarizing film is 45°;
   a retardation value of the second retardation film is substantially equivalent to a quarter-wavelength.

8. A liquid crystal display device comprising:
   an STN liquid crystal element comprised of 200° to 260° twist aligned nematic liquid crystal sandwiched between a first substrate thereof, provided with a transflective reflector and first electrodes, and a second substrate thereof, provided with second electrodes;
   a first retardation film disposed on the outer side of the second substrate of the STN liquid crystal element;
   a first polarizing film disposed on the outer side of the first retardation film;
   a second retardation film disposed on the outer side of the first substrate of the STN liquid crystal element;
   a third retardation film disposed on the outer side of the second retardation film;
   a second polarizing film disposed on the outer side of the third retardation film; and
   a backlight disposed on the outer side of the second polarizing film,
   wherein a Δnd value indicating a birefringent tendency of the STN liquid crystal element is in a range of 0.7 µm to 0.8 µm, a retardation value of the first retardation film indicating a birefringent tendency thereof is in a range of 0.35 to 0.40 µm, an intersection angle formed by a phase delay axis of the first retardation film and an absorption axis or a transmission axis of the first polarizing film is a range of 30° to 45°,
   a phase delay axis of the second retardation film crosses a phase delay axis of the third retardation film at about 60°, and a retardation value of the second retardation film is substantially equivalent to a quarter-wavelength while a retardation value of the third retardation film is substantially equivalent to a half-wavelength.

9. A liquid crystal display device comprising:
   an STN liquid crystal element comprised of 200° to 260° twist aligned nematic liquid crystal sandwiched between a first substrate thereof, provided with a transflective reflector and first electrodes, and a second substrate thereof, provided with second electrodes;
   a first retardation film disposed on the outer side of the second substrate of the STN liquid crystal element;
   a first polarizing film disposed on the outer side of the first retardation film;
   a second retardation film disposed on the outer side of the first substrate of the STN liquid crystal element;
   a third retardation film disposed on the outer side of the second retardation film;

a second polarizing film disposed on the outer side of the third retardation film; and a backlight disposed on the outer side of the second polarizing film, wherein a Δnd value indicating a birefringent tendency of the STN liquid crystal element is in a range of 0.7 μm to 0.8 μm, a retardation value of the first retardation film is in a range of 0.35 to 0.40 μm, an intersection angle formed by a phase delay axis of the first retardation film and an absorption axis or a transmission axis of the first polarizing film is a range of 30° to 45°, a phase delay axis of the second retardation film crosses a phase delay axis of the third retardation film substantially at right angles, wavelength-dependency of a retardation value of the second retardation film differs from wavelength-dependency of a retardation value of the third retardation film, and the difference between the retardation value of the second retardation film and the retardation value of the third retardation film is substantially equivalent to a quarter-wavelength.

10. A liquid crystal display device according to claim 7, wherein a diffusion film is installed on the outer side of the second substrate.

11. A liquid crystal display device according to claim 8, wherein a diffusion film is installed on the outer side of the second substrate.

12. A liquid crystal display device according to claim 9, wherein a diffusion film is installed on the outer side of the second substrate.

13. A liquid crystal display device according to claim 7, wherein color filters are installed on the nematic liquid crystal side of the first substrate than the transflective reflector, or on the nematic licuid crystal side the second substrate.

14. A liquid crystal display device according to claim 8, wherein color filters are installed on the nematic liquid crystal side of the first substrate than the transflective reflector, or on the nematic licuid crystal side the second substrate.

15. A liquid crystal display device according to claim 9, wherein color filters are installed on the nematic liquid crystal side of the first substrate than the transflective reflector, or on the nematic licuid crystal side the second substrate.

16. A liquid crystal display device according to claim 7, wherein refractive indices of the first retardation film have a relationship as expressed by the formula:

$$nx>nz>ny$$

where nx is a refractive index in the direction of the phase delay axis thereof, ny is a refractive index in the direction orthogonal to the phase delay axis, and nz is a refractive index in the direction of thickness thereof.

17. A liquid crystal display device according to claim 8, wherein refractive indices of the first retardation film have a relationship as expressed by the formula:

$$nx>nz>ny$$

where nx is a refractive index in the direction of the phase delay axis thereof, ny is a refractive index in the direction orthogonal to the phase delay axis, and nz is a refractive index in the direction of thickness thereof.

18. A liquid crystal display device according to claim 9, wherein refractive indices of the first retardation film have a relationship as expressed by the formula:

$$nx>nz>ny$$

where nx is a refractive index in the direction of the phase delay axis thereof, ny is a refractive index in the direction orthogonal to the phase delay axis, and nz is a refractive index in the direction of thickness thereof.

19. A liquid crystal display device according to claim 7, wherein the transflective reflector is composed of a thin metal film with thickness in a range of 0.01 to 0.03 μm.

20. A liquid crystal display device according to claim 8, wherein the transflective reflector is composed of a thin metal film with thickness in a range of 0.01 to 0.03 μm.

21. A liquid crystal display device according to claim 9, wherein the transflective reflector is composed of a thin metal film with thickness in a range of 0.01 to 0.03 μm.

22. A liquid crystal display device according to claim 7, wherein the transflective reflector is a thin metal film provided with an opening corresponding to respective pixels.

23. A liquid crystal display device according to claim 8, wherein the transflective reflector is a thin metal film provided with an opening corresponding to respective pixels.

24. A liquid crystal display device according to claim 9, wherein the transflective reflector is a thin metal film provided with an opening corresponding to respective pixels.

* * * * *